United States Patent
Park et al.

(10) Patent No.: US 12,549,294 B2
(45) Date of Patent: Feb. 10, 2026

(54) APPARATUS AND METHOD FOR CONFIGURING SUB-SLOTS AND TRANSMITTING UPLINK INFORMATION IN WIRELESS COMMUNICATION SYSTEM

(71) Applicant: Samsung Electronics Co., Ltd., Suwon-si (KR)

(72) Inventors: Sungjin Park, Suwon-si (KR); Jonghyun Bang, Suwon-si (KR); Jeongho Yeo, Suwon-si (KR); Hyunseok Ryu, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 17/633,447

(22) PCT Filed: Jul. 31, 2020

(86) PCT No.: PCT/KR2020/010138
§ 371 (c)(1),
(2) Date: Feb. 7, 2022

(87) PCT Pub. No.: WO2021/025390
PCT Pub. Date: Feb. 11, 2021

(65) Prior Publication Data
US 2022/0294575 A1    Sep. 15, 2022

(30) Foreign Application Priority Data

Aug. 7, 2019  (KR) .................. 10-2019-0096148

(51) Int. Cl.
*H04W 72/04*  (2023.01)
*H04L 1/1829*  (2023.01)
(Continued)

(52) U.S. Cl.
CPC .......... *H04L 1/1861* (2013.01); *H04L 5/0055* (2013.01); *H04W 72/1273* (2013.01); *H04W 72/21* (2023.01)

(58) Field of Classification Search
CPC ... H04L 1/1861; H04L 1/1854; H04L 1/1858; H04L 1/1864; H04L 1/1678;
(Continued)

(56) References Cited

U.S. PATENT DOCUMENTS

2013/0058291 A1   3/2013  Ahn et al.
2018/0092090 A1*  3/2018  Li ..................... H04W 72/20
(Continued)

FOREIGN PATENT DOCUMENTS

KR   10-2016-0091491 A   8/2016
KR   10-2019-0056933 A   5/2019
(Continued)

OTHER PUBLICATIONS

OPPO, 'Summary on UCI enhancements for URLLC', R1-1907683, 3GPP TSG RAN WG1#97, Reno, USA, May 16, 2019, pp. 1-8.
(Continued)

*Primary Examiner* — Mahbubul Bar Chowdhury
(74) *Attorney, Agent, or Firm* — Jefferson IP Law, LLP

(57) ABSTRACT

The present disclosure relates to a 5th generation (5G) or pre-5G communication system for supporting a data transmission rate higher than that of a 4th generation (4G) communication system such as long term evolution (LTE). The present disclosure relates to a method for operating a terminal, for configuring sub-slots and transmitting uplink information in a wireless communication system, the method comprising the steps of: receiving scheduling information; receiving downlink data from a resource indicated by the scheduling information; and transmitting acknowledgement (ACK) information on the downlink data by using
(Continued)

one of sub-slots determined on the basis of a configuration of sub-slots. The sub-slots may have a time length shorter than that of a slot.

8 Claims, 17 Drawing Sheets

(51) Int. Cl.
*H04L 5/00* (2006.01)
*H04W 72/1273* (2023.01)
*H04W 72/21* (2023.01)

(58) Field of Classification Search
CPC ............ H04L 5/0055; H04W 72/1273; H04W 72/21; H04W 72/23
See application file for complete search history.

(56) References Cited

U.S. PATENT DOCUMENTS

| | | | |
|---|---|---|---|
| 2018/0376500 A1 | 12/2018 | Yang | |
| 2019/0313386 A1* | 10/2019 | Hwang | H04L 5/0094 |
| 2020/0008015 A1* | 1/2020 | Frank | H04W 4/06 |
| 2020/0008194 A1* | 1/2020 | Huang | H04L 5/0053 |
| 2020/0267597 A1* | 8/2020 | Huang | H04L 1/1812 |
| 2020/0351838 A1 | 11/2020 | Kim et al. | |
| 2021/0006376 A1* | 1/2021 | Cirik | H04L 5/0094 |
| 2021/0211241 A1* | 7/2021 | Xiong | H04W 72/0446 |
| 2021/0274533 A1* | 9/2021 | Gao | H04L 5/0007 |
| 2021/0400652 A1* | 12/2021 | Yoshioka | H04L 1/1854 |
| 2022/0070900 A1* | 3/2022 | Yin | H04L 1/0003 |
| 2022/0085956 A1* | 3/2022 | Yin | H04L 7/06 |
| 2022/0158800 A1* | 5/2022 | Jiao | H04L 1/1854 |
| 2022/0159692 A1* | 5/2022 | Lee | H04L 5/0053 |
| 2022/0200743 A1* | 6/2022 | Yoshioka | H04L 27/26 |
| 2022/0279483 A1* | 9/2022 | Gao | H04W 72/0446 |

FOREIGN PATENT DOCUMENTS

| | | |
|---|---|---|
| KR | 10-2020-0034559 A | 3/2020 |
| WO | 2010/123286 A2 | 10/2010 |
| WO | 2011/115389 A2 | 9/2011 |
| WO | 2017/105145 A1 | 6/2017 |

OTHER PUBLICATIONS

Vivo, "Uci enhancements for URLLC", 3GPP Draft, R1-1904082, 3GPP TSG RAN WG1 #96bis, Xi'an, China, Apr. 8, 2019-Apr. 12, 2019, Apr. 3, 2019, XP051707105.

Samsung, "UL Control for URLLC", 3GPP Draft, R1-1906956, 3GPP TSG RAN WG1 #97, Reno, USA, May 13, 2019-May 17, 2019, May 3, 2019, pp. 1-5, XP051708991.

Extended European Search Report dated Aug. 11, 2022, issued in European Patent Application No. 20850454.8-1213.

European Office Action dated Jan. 31, 2024, issued in European Patent Application No. 20850454.8.

Korean Office Action dated Dec. 23, 2024, issued in Korean Patent Application No. 10-2019-0096148.

European Office Action dated Mar. 21, 2025, issued in a European Patent Application No. 20850454.8.

Korean Office Action dated Oct. 27, 2025, issued in Korean Patent Application No. 10-2019-0096148.

* cited by examiner

APPARATUS AND METHOD FOR CONFIGURING SUB-SLOTS AND TRANSMITTING UPLINK INFORMATION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/010138, filed on Jul. 31, 2020, which is based on and claims priority of a Korean patent application number 10-2019-0096148, filed on Aug. 7, 2019, in the Korean Intellectual Property Office, the disclosure of which is incorporated by reference herein in its entirety.

TECHNICAL FIELD

The disclosure generally relates to a wireless communication system, and more particularly, to an apparatus and a method for configuring sub-slots and transmitting uplink information in a wireless communication system.

BACKGROUND ART

Efforts to develop enhanced 5th generation (5G) communication systems or pre-5G communication systems have been ongoing in order to meet the increasing demand for wireless data traffic since 4th generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, enhanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

DISCLOSURE OF INVENTION

Technical Problem

The disclosure provides a method and an apparatus for configuring a HARQ-ACK codebook in a situation where a terminal transmits one or more HARQ-ACKs in one slot.

Solution to Problem

According to various embodiments of the disclosure, an operating method of a terminal in a wireless communication system includes: receiving scheduling information; receiving downlink data in a resource indicated by the scheduling information; and transmitting acknowledge (ACK) information on the downlink data by using one of sub-slots which are determined based on configuration of sub-slots. The sub-slot may have a time length shorter than that of a slot.

According to various embodiments of the disclosure, a terminal in a wireless communication system includes: a transceiver; and at least one processor connected with the transceiver. The at least one processor may receive scheduling information, may receive downlink data in a resource indicated by the scheduling information, and may transmit acknowledge (ACK) information on the downlink data by using one of sub-slots which are determined based on configuration of sub-slots. The sub-slot may have a time length shorter than that of a slot.

Advantageous Effects of Invention

The disclosed embodiment may effectively provide a service in a wireless communication system.

The effect achieved in the disclosure is not limited to those mentioned above, and other effects that are not mentioned above may be clearly understood to those skilled in the art based on the description provided below.

BEST MODE FOR CARRYING OUT THE INVENTION

Figure 1:
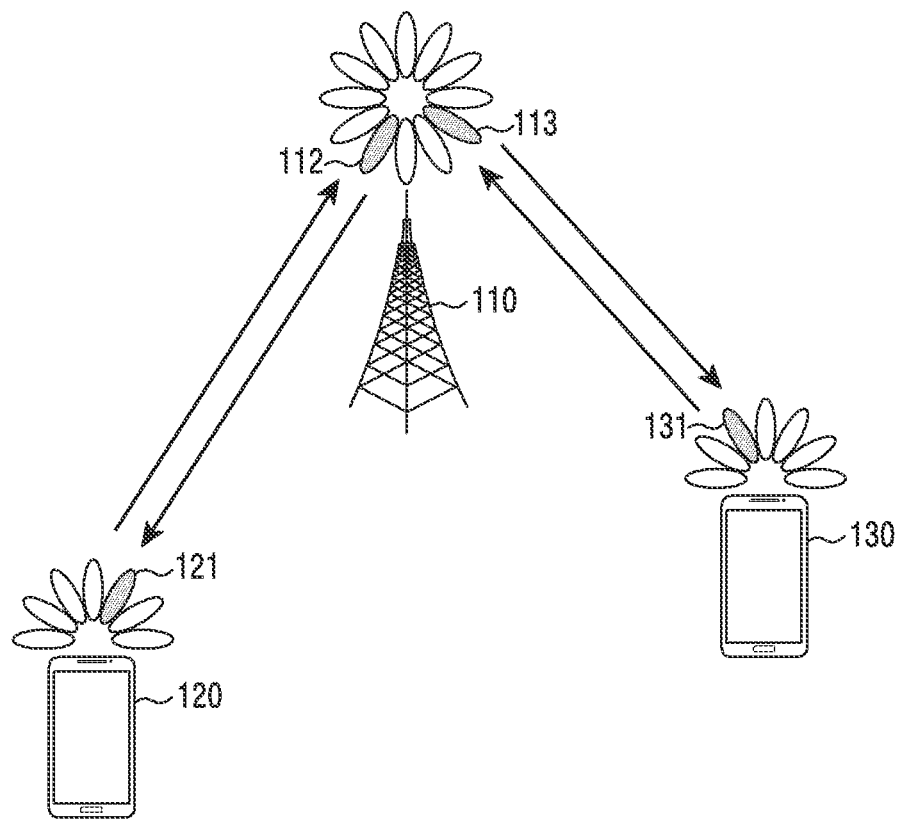
FIG. 1 is a view illustrating a wireless communication system according to various embodiments of the disclosure.

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to an apparatus and a method for configurating sub-slots and transmitting uplink information in a wireless communication system. Specifically, the disclosure describes a technique for indicating a feedback time by using a time resource unit which is shorter than a lost in a wireless communication system.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same technical meanings may be used.

In the following descriptions, a physical channel and a signal may be interchangeably used with data or a control signal. For example, a physical downlink shared channel (PDSCH) is a term indicating a physical channel through which data is transmitted, but may be used to indicate data.

In the disclosure, higher signaling refers to a signal transmission method for transmitting, by a base station, signals to a terminal by using a downlink data channel of a physical layer, or for transmitting, by a terminal, signals to a base station by using an uplink data channel of a physical layer. The higher signaling may be understood as radio resource control (RRC) signaling or a MAC control element (CE).

In addition, in the disclosure, the expression "exceeding" or "being less than" may be used to determine whether a specific condition is satisfied, fulfilled, but these are just for expressing one example and do not exclude the expression "being greater than or equal to" or "being less than or equal to". The condition described by "being greater than or equal to" may be substituted with "exceeding", the condition described by "being less than or equal to" may be substituted with "being less than", and the condition described by "being greater than or equal to and less than" may be substituted with "exceeding and being less than or equal to".

In addition, the disclosure describes various embodiments by using terms used in some communication standards (for example, 3rd generation partnership project (3GPP)), but these embodiments are merely examples. Various embodiments of the disclosure may be easily modified and applied to other communication systems.

FIG. 1 illustrates a wireless communication system according to various embodiments of the disclosure. FIG. 1 illustrates a base station 110, a terminal 120, and a terminal 130 as part of nodes using a wireless channel in a wireless communication system. FIG. 1 illustrates only one base station, but other base stations which are the same as or similar to the base station 110 may further be included.

The base station 110 is a network infrastructure that provides wireless access to the terminals 120, 130. The base station 110 has a coverage that is defined as a predetermined geographical area based on a distance by which a signal can be transmitted. The base station 110 may be referred to as "access point (AP)," "eNodeB (eNB)," "5th generation (5G) node," "next generation nodeB (gNB)," "wireless point," "transmission/reception point (TRP)," or other terms having the same technical meaning as the above-mentioned terms, in addition to the base station.

Each of the terminal 120 and the terminal 130 is a device which is used by a user, and may communicate with the base station 110 through a wireless channel A link going from the base station 110 to the terminal 120 or the terminal 130 may be referred to as downlink (DL), and a link going from the terminal 120 or the terminal 130 to the base station 110 may be referred to as uplink (UL). In some cases, at least one of the terminal 120 and the terminal 130 may be operated without user's intervention. That is, at least one of the terminal 120 and the terminal 130 is a device which performs machine type communication (MTC), and may not be carried by a user. Each of the terminal 120 and the terminal 130 may be referred to as "user equipment (UE)," "mobile station," "subscriber station," "remote terminal," "wireless terminal," or "user device," or other terms having the same technical meaning as the above-mentioned terms, in addition to the terminal.

The base station 110, the terminal 120, the terminal 130 may transmit and receive wireless signals in millimeter wave (mmWave) bands (for example, 28 GHz, 30 GHz, 38 GHz, 60 GHz). In this case, the base station 110, the terminal 120, the terminal 130 may perform beamforming to enhance a channel gain. Herein, beamforming may include transmission beamforming and reception beamforming That is, the base station 110, the terminal 120, the terminal 130 may give directivity to a transmission signal or a reception signal. To achieve this, the base station 110 and the terminals 120, 130 may select serving beams 112, 113, 121, 131 through a beam search or beam management procedure. After the serving beams 112, 113, 121, 131 are selected, communication may be performed through resources that have a quasi co-located (QCL) relationship with resources which transmit the serving beams 112, 113, 121, 131.

As long as large-scale characteristics of a channel which transmits a symbol on a first antenna port can be inferred from a channel which transmits a symbol on a second antenna port, the first antenna port and the second antenna port may be evaluated as having a QCL relationship. For example, the large-scale characteristics may include at least one of delay spread, doppler spread, doppler shift, average gain, average delay, spatial receiver parameter.

Figure 2:
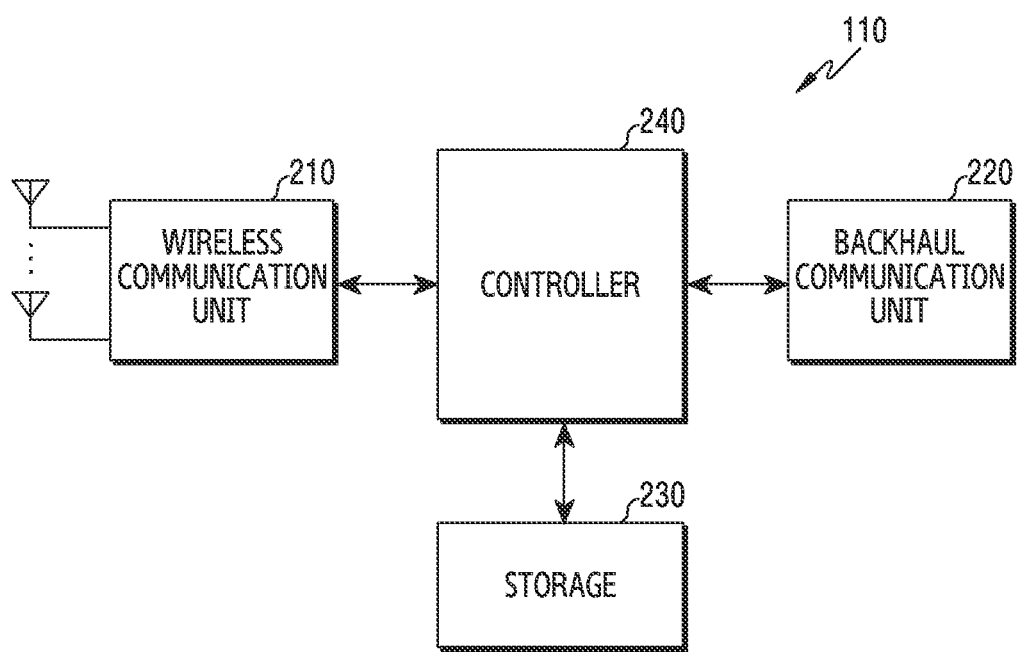
FIG. 2 is a view illustrating a configuration of a base station in a wireless communication system according to various embodiments of the disclosure.

FIG. 2 illustrates a configuration of a base station in a wireless communication system according to various embodiments of the disclosure. The configuration illustrated in FIG. 2 may be understood as a configuration of the base station 110. The term "unit" or terms ending with suffixes "-er," and "-or" refer to a unit processing at least one function or operation, and may be implemented by hardware, software, or a combination of hardware and software.

Referring to FIG. 2, the base station may include a wireless communication unit 210, a backhaul communication unit 220, a storage 230, and a controller 240.

The wireless communication unit 210 performs functions for transmitting and receiving signals via a wireless channel. For example, the wireless communication unit 210 may perform a function of converting between a baseband signal and a bit stream according to a physical layer standard of a system. For example, when transmitting data, the wireless communication unit 210 may generate complex symbols by encoding and modulating a transmission bit stream. In addition, when receiving data, the wireless communication unit 210 may restore a reception bit stream by demodulating and decoding a baseband signal.

In addition, the wireless communication unit 210 may up-convert a baseband signal into a radio frequency (RF) band signal, and then may transmit the signal via an antenna, and may down-convert an RF band signal received via an antenna into a baseband signal. To achieve this, the wireless communication unit 210 may include a transmission filter, a reception filter, an amplifier, a mixer, an oscillator, a digital to analog converter (DAC), an analog to digital converter (ADC), or the like. In addition, the wireless communication unit 210 may include a plurality of transmission and reception paths. Furthermore, the wireless communication unit 210 may include at least one antenna array including a plurality of antenna elements.

In the hardware aspect, the wireless communication unit 210 may be configured by a digital unit and an analog unit, and the analog unit may be configured by a plurality of sub-units according to operating power, an operating frequency, or the like. The digital unit may be implemented by at least one processor (for example, a digital signal processor (DSP)).

The wireless communication unit 210 may transmit and receive signals as described above. Accordingly, an entirety or a part of the wireless communication unit 210 may be referred to as "transmitter," "receiver," or "transceiver." In addition, in the following description, transmitting and receiving via a wireless channel may be used as a meaning including processing by the wireless communication unit 210 as described above.

The backhaul communication unit 220 provides an interface for communicating with the other nodes in the network. That is, the backhaul communication unit 220 may convert a bit stream to be transmitted from the base station to another node, for example, another access node, another base station, a higher node, a core network, or the like, into a physical signal, and may convert a physical signal transmitted from another node into a bit stream.

The storage 230 may store data such as a basic program for the operation of the base station, an application program, configuration information, or the like. The storage 230 may be configured by a volatile memory, a nonvolatile memory, or a combination of a volatile memory and a nonvolatile memory. In addition, the storage 230 provides stored data according to a request of the controller 240.

The controller 240 controls overall operations of the base station. For example, the controller 240 may transmit and receive signals via the wireless communication unit 210 or the backhaul communication unit 220. In addition, the controller 240 may write and read out data on or from the storage 230. In addition, the controller 240 may perform functions of a protocol stack required by the communication standard. According to another implementation example, the protocol stack may be included in the wireless communication unit 210. To achieve this, the controller 240 may include at least one processor. According to various embodiments, the controller 240 may control the base station to perform operations according to various embodiments, which will be described below.

Figure 3:
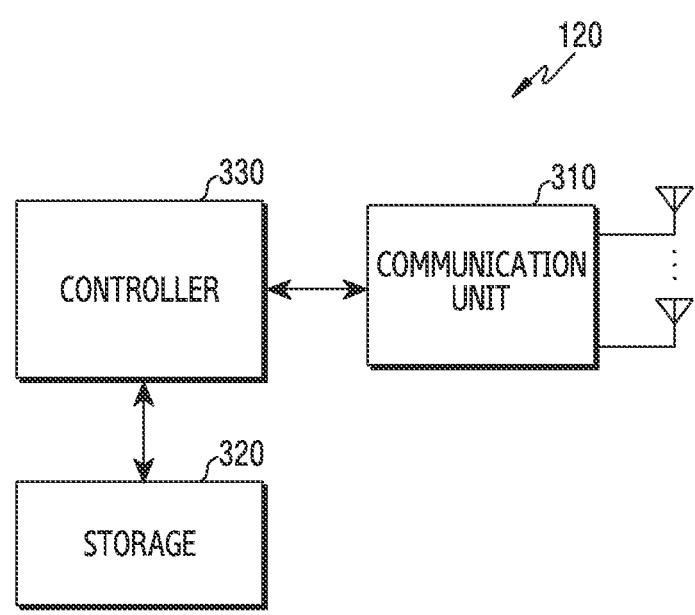
FIG. 3 is a view illustrating a configuration of a terminal in a wireless communication system according to various embodiments of the disclosure.

FIG. 3 illustrates a configuration of a terminal in a wireless communication system according to various embodiments of the disclosure. The configuration illustrated in FIG. 3 may be understood as a configuration of the terminal 120. The term "unit" or terms ending with suffixes "-er," and "-or" used in the following description refer to a unit processing at least one function or operation, and may be implemented by hardware, software, or a combination of hardware and software.

Referring to FIG. 3, the terminal may include a communication unit 310, a storage 320, and a controller 330.

The communication unit 310 performs functions for transmitting and receiving signals via a wireless channel. For example, the communication unit 310 may perform a function of converting between a baseband signal and a bit stream according to a physical layer standard of a system. For example, when transmitting data, the communication unit 310 may generate complex symbols by encoding and modulating a transmission bit stream. In addition, when receiving data, the communication unit 310 may restore a reception bit stream by demodulating and decoding a baseband signal. In addition, the communication unit 310 may up-convert a baseband signal into an RF band signal, and then may transmit the signal via an antenna, and may down-convert an RF band signal received via an antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission and reception paths. Furthermore, the communication unit 310 may include at least one antenna array including a plurality of antenna elements. In the hardware aspect, the communication unit 310 may be configured by a digital circuit and an analog circuit (for example, a radio frequency integrated circuit (RFIC)). Herein, the digital circuit and the analog circuit may be implemented as a single package. In addition, the communication unit 310 may include a plurality of RF chains. Furthermore, the communication unit 310 may perform beamforming.

The communication unit 310 may transmit and receive signals as described above. Accordingly, an entirety or part of the communication unit 310 may be referred to as "transmitter," "receiver," or "transceiver." In addition, in the following descriptions, transmitting and receiving via a wireless channel may be used as a meaning including processing by the communication unit 310 as described above.

The storage 320 may store data such as a basic program for the operation of the terminal, an application program, configuration information, or the like. The storage 320 may be configured by a volatile memory, a nonvolatile memory, or a combination of a volatile memory and a nonvolatile memory. In addition, the storage 320 provides stored data according to a request of the controller 330.

The controller 330 controls overall operations of the terminal. For example, the controller 330 may transmit and receive signals via the communication unit 310. In addition, the controller 330 may write and read out data on or from the storage 320. In addition, the controller 330 may perform functions of a protocol stack required by the communication standard. To achieve this, the controller 330 may include at least one processor or micro processor, or may be a part of a processor. In addition, a part of the communication unit 310 and the controller 330 may be referred to as a communication processor (CP). According to various embodiments, the controller 330 may control the terminal to perform operations according to various embodiments, which will be described below.

Figure 4:
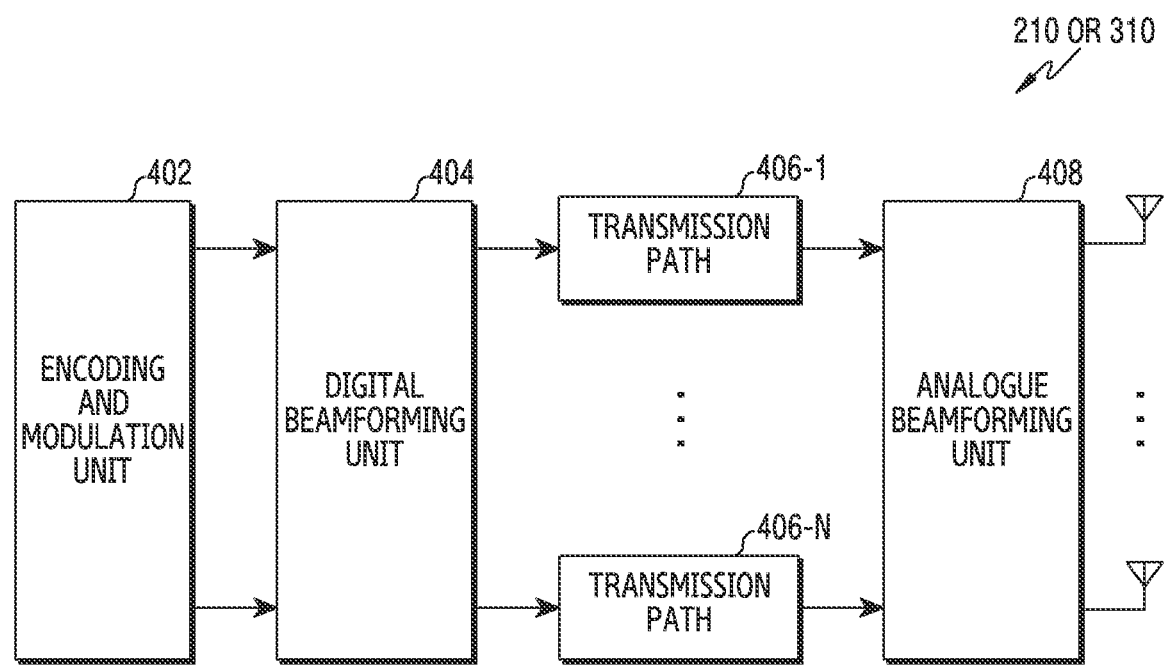
FIG. 4 is a view illustrating a configuration of a communication unit in a wireless communication system according to various embodiments of the disclosure.

FIG. 4 illustrates a configuration of a communication unit in a wireless communication system according to various embodiments of the disclosure. FIG. 4 illustrates an example of a detailed configuration of the wireless communication unit 210 of FIG. 2 or the wireless communication 310 of FIG. 3. Specifically, FIG. 4 illustrates components for performing beamforming as part of the wireless communication unit 210 of FIG. 2 or the communication unit 310 of FIG. 3.

Referring to FIG. 4, the wireless communication unit 210 or the communication unit 310 may include an encoding and modulation unit 402, a digital beamforming unit 404, a plurality of transmission paths 406-1 to 406-N, an analog beamforming unit 408.

The encoding and modulation unit 402 performs channel encoding. To perform channel encoding, at least one of a low density parity check (LDPC) code, a convolution code, a polar code may be used. The encoding and modulation unit 402 may generate modulation symbols by performing constellation mapping.

The digital beamforming unit 404 performs beamforming with respect to a digital signal (for example, modulation symbols). To achieve this, the digital beamforming unit 404 multiplies modulation symbols by beamforming weights. Herein, the beamforming weights may be used to change a size and a phase of a signal, and may be referred to as "precoding matrix," "precoder." The digital beamforming unit 404 outputs digitally beamformed modulation symbols to the plurality of transmission paths 406-1 to 406-N. In this case, according to the multiple input multiple output (MIMO) transmission technique, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To achieve this, each of the plurality of transmission paths 406-1 to 406-N may include an inverse fast Fourier transform (IFFT) calculation unit, a cyclic prefix (CP) insertion unit, a DAC, an up-conversion unit. The CP insertion unit is to perform orthogonal frequency division multiplexing (OFDM), and may be excluded when other physical layer methods (for example, a filter bank multi-carrier (FBMC)) are applied. That is, the plurality of transmission paths 406-1 to 406-N provide independent signal processing processes with respect to a plurality of streams generated through digital beamforming. However, some of the components of the plurality of transmission paths 406-1 to 406-N may be used in common according to an implementation method.

The analog beamforming unit 408 performs beamforming with respect to an analog signal. To achieve this, the analog beamforming unit 408 multiplies analog signals by beamforming weights. Herein, the beamforming weights may be used to change a size and a phase of a signal. Specifically, the analog beamforming unit 440 may be configured variously according to connection structures between the plurality of transmission paths 406-1 to 406-N and antennas. For example, each of the plurality of transmission paths 406-1 to 406-N may be connected with one antenna array. In another example, the plurality of transmission paths 406-1 to 406-N may be connected with one antenna array. In still another example, the plurality of transmission paths 406-1 to 406-N may be adaptively connected with one antenna array or may be connected with two or more antenna arrays.

Departing from their initial function of providing voice-oriented services, wireless communication systems are developing into broadband wireless communication systems that provide packet data services of high-speed, high quality, like communication standards such as high speed packet access (HSPA), long term evolution (LTE) or evolved universal terrestrial radio access (E-UTRA), LTE-advanced (LTE-A) of 3GPP, high rate packet data (HRPD), ultra mobile broadband (UMB) of 3GPP2, and 802.16e of IEEE. In addition, for 5th generation (5G) wireless communication systems, communication standards of 5G or new radio (NR) are being established.

A 5G or NR system may employ an orthogonal frequency division multiplexing (OFDM) scheme for a downlink (DL) and an uplink. More specifically, a cyclic-prefix OFDM (CP-OFDM) scheme may be employed in a downlink, and discrete Fourier transform spreading OFDM (DFT-S-OFDM) may be employed in an uplink, along with the CP-OFDM. The uplink refers to a radio link through which a terminal transmits data or a control signal to a base station, and the downlink refers to a radio link through which a base station transmits data or a control signal to a terminal. A multiple access scheme may typically divide data or control information of each user by allocating and managing the data or control information, such that time-frequency resources for carrying data or control information for each user do not overlap, that is, orthogonality is established.

The 5G or NR system employs a hybrid automatic repeat request (HARQ) scheme which, when decoding fails in initial transmission, retransmits corresponding data on a physical layer. According to the HARQ scheme, when a receiver does not exactly decode data, the receiver transmits negative acknowledgement (NACK), which is information indicating failure to decode, to a transmitter, thereby enabling the transmitter to retransmit corresponding data on a physical layer. The receiver may enhance data reception performance by combining the data retransmitted by the transmitted with previous data that the receiver has failed to decode. In addition, when the receiver exactly decodes data, the receiver transmits acknowledgement (ACK), which is information indicating success in decoding, to the transmitter, thereby enabling the transmitter to transmit new data.

Meanwhile, as researches on next-generation communication systems are ongoing, various schemes for scheduling communication with terminals are being discussed. Accordingly, there is a demand for a scheme for efficiently scheduling and transmitting and receiving data by considering characteristics of next-generation communication systems. Accordingly, there is a demand for a scheme for providing services within the same time section to suit characteristics of a corresponding service in order to the plurality of services to a user.

The NR system employs a hybrid automatic repeat request (HARQ) scheme which, when decoding fails in initial transmission, retransmits corresponding data on a physical layer. In the HARQ scheme, when a receiver does not exactly decode data, the receiver transmits negative acknowledgement (NACK), which is information indicating failure to decode, to a transmitter, thereby enabling the transmitter to retransmit corresponding data on a physical layer. The receiver may enhance data reception performance by combining the data retransmitted by the transmitted with previous data that the receiver has failed to decode. In addition, when the receiver exactly decodes data, the receiver transmits acknowledgement (ACK), which is information indicating success in decoding, to the transmitter, thereby enabling the transmitter to transmit new data.

In the 5G or NR system, a base station may configure one component carrier (CC) or a plurality of CCs for downlink transmission to a terminal. In addition, in each CC, at least one slot and symbol for downlink transmission and/or uplink transmission may be set. When a physical downlink shared channel (PDSCH), which is downlink data, is scheduled, at least one of timing information of a slot onto which the PDSCH is mapped, a position of a start symbol onto which the PDSCH is mapped in the corresponding slot, and information of the number of symbols onto which the PDSCH is mapped may be transmitted in a specific bit field of downlink control information (DCI). For example, when DCI is transmitted in slot #n and the PDSCH is scheduled, if timing information of the slot in which the PDSCH is transmitted, K0, indicates 0, a start symbol position is 0, and a symbol length is 7, the corresponding PDSCH may be mapped onto 7 symbols from symbol number 0 of slot #n. On the other hand, the PDSCH which is a downlink data signal is transmitted, and, after K1 slot, HARQ-ACK feedback is transmitted from the terminal to the base station. Information of a timing at which the HARQ-ACK is transmitted, K1 information, is included in the DCI. A set of candidates of possible K1 values may be transmitted by higher signaling, and one of values included in the set of candidates in the DCI may be determined as a K1 value.

When a semi-static HARQ-ACK codebook is configured for the terminal, the terminal may determine a table including information of the slot onto which the PDSCH is mapped, K0, start symbol information, the number of symbols or length information, and may determine a feedback bit that should be transmitted by K1 candidate values which are HARQ-ACK feedback timing information on the PDSCH, or a HARQ-ACK codebook size. The table including the information of the slot onto which the PDSCH is mapped, the start symbol information, the number of symbols or length information may have a default value, and there may be a table that may be set for the terminal by the base station.

When a dynamic HARQ-ACK codebook is configured for the terminal, the terminal may determine a HARQ-ACK feedback bit or a HARQ-ACK codebook size that should be transmitted by the terminal, based on downlink assignment indicator (DAI) information included in the DCI, in a slot in which HARQ-ACK information is transmitted by the information of the slot onto which the PDSCH is mapped, K0, and HARQ-ACK feedback timing information on the PDSCH, K1.

Figure 5:
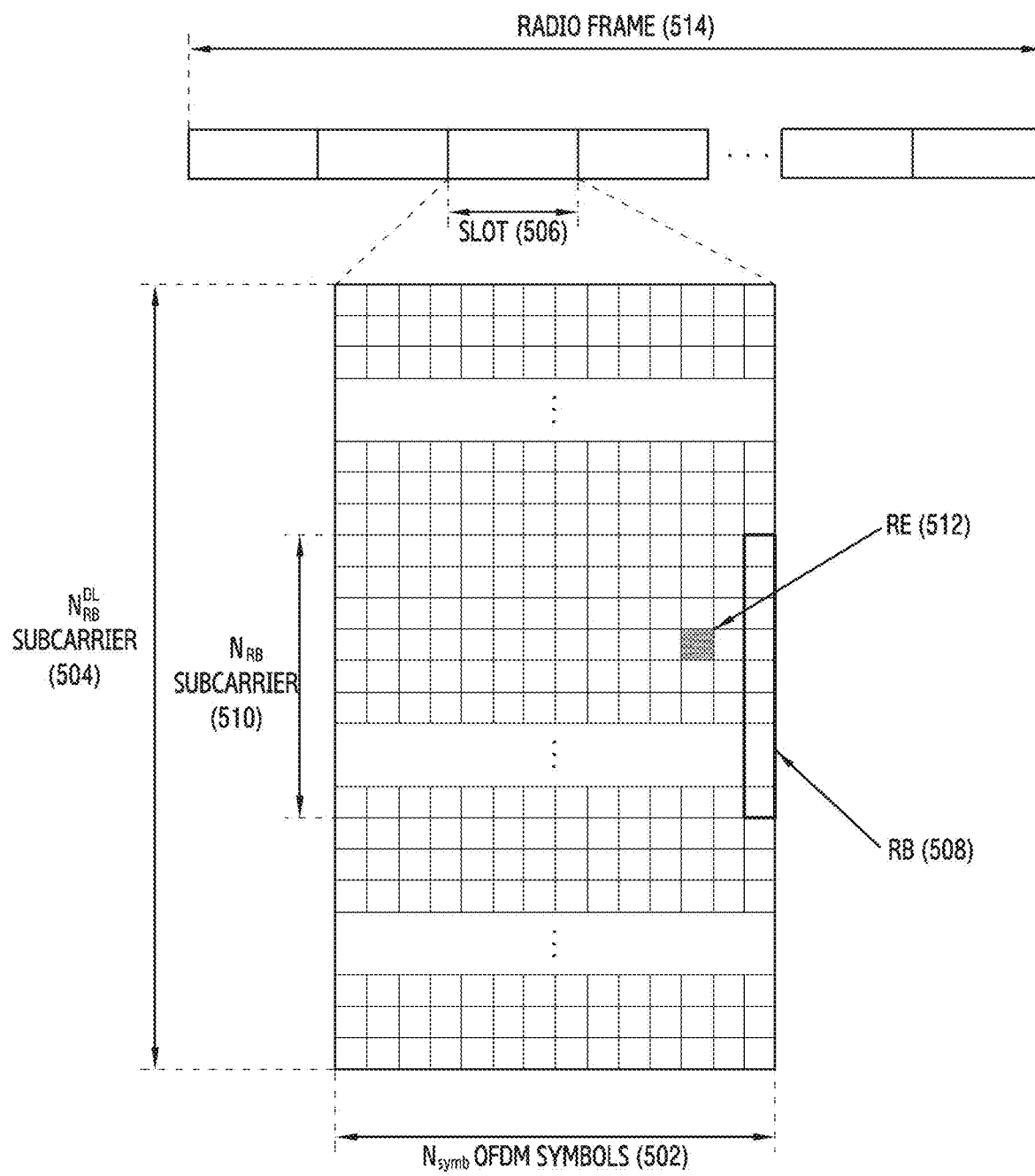
FIG. 5 is a view illustrating a structure of a time-frequency domain which is a radio resource domain in a wireless communication system according to various embodiments of the disclosure.

FIG. 5 illustrates a structure of a time-frequency domain which is a radio resource domain in a wireless communication system according to various embodiments of the disclosure.

Referring to FIG. 5, in the radio resource domain, the horizontal axis indicates a time domain and the vertical axis indicates a frequency domain. A minimum transmission unit in the time domain is an OFDM symbol or a DFT-S-OFDM symbol, and Nsymb number of OFDM symbols or DFT-S-OFDM symbols (e.g., continuous OFDM symbols 502) are included in one slot 506. A length of a sub-frame may be defined as 1.0 ms, and a length of a radio frame 514 may be defined as 10 ms. A minimum transmission unit in the frequency domain is a subcarrier and the bandwidth of whole system transmission band may include NBW number of sub-carriers 504. Specific figures Nsymb, NBW, may be variably applied according to a system.

A basic unit of the time-frequency resource domain is a resource element (RE) 512, which may be indicated by an OFDM symbol or DFT-S-OFDM symbol index and a sub-carrier index. A resource block (RB) 508 or a physical resource block (PRB) may be defined by Nsymb number of continuous OFDM symbols 502 in the time domain and NRB number of continuous subcarriers 510 in the frequency domain. Accordingly, one RB 508 may be configured by Nsymb×NRB number of REs 512.

In general, a minimum transmission unit of data may be the RB unit. In the 5G or NR system, generally, Nsymb=14, NRB=12, and NBW and NRB may be proportional to the bandwidth of the system transmission band. A data rate may increase in proportion to the number of RBs scheduled for a terminal. In a 5G or NR system, in the case of a frequency division duplex (FDD) system, which distinguishes between a downlink and an uplink according to a frequency and operates, a downlink transmission bandwidth and an uplink transmission bandwidth may be different from each other. A channel bandwidth indicates an RF bandwidth corresponding to the system transmission bandwidth. Table 1 presented below shows a corresponding relationship between a system transmission bandwidth and a channel bandwidth which are defined in an LTE system of 4th generation wireless communication before the 5G or NR system. For example, in an LTE system having a channel bandwidth of 10 MHz, a transmission bandwidth may be configured by 50 RBs.

TABLE 1

| Channel Bandwidth $BW_{channel}$ [MHz] | 1.4 | 3 | 5 | 10 | 15 | 20 |
|---|---|---|---|---|---|---|
| Transmission Bandwidth Configuration | 6 | 15 | 25 | 50 | 75 | 100 |

The 5G or NR system may operate in a broader channel bandwidth than the channel bandwidth of LTE suggested in Table 1. Table 2 shows a corresponding relationship among a system transmission bandwidth, a channel bandwidth, and subcarrier spacing (SCS) in the 5G or NR system:

TABLE 2

| SCS [kHz] | Channel Bandwidth BW$_{channel}$ [MHz] | | | | | | | | | |
|---|---|---|---|---|---|---|---|---|---|---|
| | | 5 | 10 | 15 | 20 | 25 | 40 | 50 | 60 | 80 | 100 |
| Maximum Transmission Bandwidth) N$_{RB}$ | 15 | 25 | 52 | 79 | 106 | 133 | 216 | 270 | N.A. | N.A. | N.A. |
| | 30 | 11 | 24 | 38 | 51 | 65 | 106 | 133 | 162 | 217 | 273 |
| | 60 | N.A. | 11 | 18 | 24 | 31 | 51 | 65 | 79 | 107 | 135 |

Scheduling information on downlink data or uplink data in the 5G or NR system may be transmitted from a base station to a terminal through DCI. The DCI may be defined according to various formats, and may include information on whether scheduling information is scheduling information on uplink data (for example, uplink grant) or scheduling information on downlink data (for example, downlink grant), information on whether the DCI is compact DCI having control information of a small size, information on whether spatial multiplexing using multiple antennas is applied, information on whether the DCI is DCI for controlling power, according to each format. For example, DCI format 1-1 which is scheduling control information on downlink data may include one piece of information of at least following control information:

Carrier indicator: This indicates through which frequency carrier data is transmitted.

DCI format indicator: This is an indicator identifying whether corresponding DCI is for an uplink or a downlink.

Bandwidth part (BWP) indicator: This indicates at which BWP data is transmitted.

Frequency domain resource assignment: This indicates an RB of a frequency domain which is assigned to data transmission. A resource to be expressed is determined according to a system bandwidth and a resource assignment method.

Time domain resource assignment: This indicates in which slot and in which OFDM symbol a data-related channel is transmitted.

VRB-to-PRB mapping: This indicates how a virtual RB (hereinafter, 'VRB') index and a physical RB (hereinafter, PRB) index are mapped.

Modulation and coding scheme (hereinafter, 'MCS'): This indicates a modulation scheme and a coding rate which are used for data transmission. That is, this indicates a coding rate value for informing a transport block size (TBS) and channel coding information, along with information on whether modulation is quadrature phase shift keying (QPSK), 16 quadrature amplitude modulation (QAM), 64 QAM, 256 QAM.

codeblock group (CBG) transmission information: This indicates information on which CBG is transmitted when CBG retransmission is set.

HARQ process number: This indicates a process number of HARQ.

New data indicator (NDI): This indicates whether transmission is HARQ initial transmission or retransmission.

Redundancy version: This indicates a redundancy version of HARQ.

Transmit power control (TPC) command for physical uplink control channel (PUCCH): This indicates a transmit power control command on a PUCCH which is an uplink control channel.

In the case of the above-described PUSCH transmission, the time domain resource assignment may be transmitted by information on a slot in which the PUSCH is transmitted, a start OFD symbol position S in the corresponding slot, and the number of OFDM symbols L onto which the PUSCH is mapped. The above-described S may be a relative position on which the slot starts, and L may indicate the number of continuous OFDM symbols, and S and L may be determined based on a start and length indicator value (hereinafter, 'SLIV') defined as shown in Table 3 presented below:

TABLE 3

If $(L - 1) \leq 7$ then
$SLIV = 14 \cdot (L - 1) + S$
else
$SLIV = 14 \cdot (14 - L + 1) + (14 - 1 - S)$
where $0 < L \leq 14 - S$ In the 5G or NR system, a table containing SLIV values on one row, a PUSCH mapping type, and information on a slot in which the PUSCH is transmitted may be set through RRC setting. Thereafter, in the time domain resource assignment of DCI, by indicating an index value in the set table, the base station may transmit, to the terminal, the SLIV value, the PUSCH mapping type, and the information on the slot in which the PUSCH is transmitted.

In the 5G or NR system, the PUSCH mapping type may be defined as a type A and a type B. In the case of the PUSCH mapping type A, a demodulation reference signal (DMRS) symbol starts in the second or third OFDM symbol in a slot. In the case of the PDSCH or PUSCH mapping type B, the DMRS symbol starts in the first OFDM symbol of the time domain resource assigned by PUSCH transmission. The above-described PUSCH time domain resource assignment method may be equally applied to PDSCH time domain resource assignment.

The DCI may be transmitted on a physical downlink control channel (PDCCH) (or control information, hereinafter, both terms are interchangeably used), which is a downlink physical control channel, after going through a channel coding and modulation process. In general, the DCI may be independently scrambled into a specific radio network temporary identifier (RNTI) (or a terminal identifier) for each terminal, and cyclic redundancy check (CRC) may be added, and, after channel coding, the DCI may be configured by independent PDCCHs and may be transmitted. The PDCCH may be mapped in a control resource set (CORESET) set for the terminal, and may be transmitted.

Downlink data may be transmitted on a physical downlink shared channel (PDSCH) which is a physical channel for transmitting downlink data only. The PDSCH may be transmitted after a control channel transmission section, and scheduling information such as a specific mapping position, a modulation scheme in a frequency domain may be determined based on DCI which is transmitted through the PDCCH.

Through the MCS in the control information constituting the DCI, the base station may notify the terminal of a modulation scheme applied to the PDSCH to transmit, and a size of data to transmit (transport block size, hereinafter "TBS"). In an embodiment, the MCS may be configured by 5 bits or more than or less than 5 bits. The TBS may correspond to a size before channel coding for error correction is applied to a transport block (hereinafter, "TB") that the base station will transmit.

In the disclosure, the TB may include a medium access control (MAC) header, a MAC control element (hereinafter, "CE"), one or more MAC service data units (SDUs), padding bits. Alternatively, the TB may indicate a unit of data which descends from the MAC layer to the physical layer, or a MAC protocol data unit (PDU).

Modulation schemes supported in the 5G or NR system may be quadrature phase shift keying (QPSK), 16 quadrature amplitude modulation (QAM), 64 QAM, and 256 QAM, and their respective modulation orders (Qm) may be 2, 4, 6, or 8. That is, in the case of QPSK, 2 bits may be transmitted per symbol, in the case of 16 QAM, 4 bits may be transmitted per symbol, in the case of 64 QAM, 6 bits may be transmitted per symbol, and in the case of 256 QAM, 8 bits may be transmitted per symbol.

In the 5G or NR system, when the terminal receives scheduling of the PDSCH or PUSCH by the DCI, if a time resource assignment field index m included in the DCI is indicated, m may indicate a combination of position information of the DRMS type A corresponding to m+1, PDSCH mapping type information, slot index K0, data resource start symbol S, data resource assignment length L in a table indicating time domain resource assignment information. For example, Table 4 is a table including time domain resource assignment information. Table 4 shows an example of CP-based PDSCH time domain resource assignment.

TABLE 4

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 4, 'dmrs-type-A-Position' is a field that informs a symbol position where a DMRS is transmitted in one slot indicated in one system information block (SIB) of terminal common control information. A possible value of the corresponding field may be 2 or 3. When the total number of symbols constituting one slot is 14 and the first symbol index is 0, 2 may indicate the third symbol and 3 may indicate the fourth symbol. In Table 4, 'PDSCH mapping type' is information indicating a position of the DMRS in a scheduled data resource domain. When 'PDSCH mapping type' is A, the DMRS is always transmitted and received in a symbol position determined in 'dmrs-typeA-Position' regardless of an assigned data time domain resource. When 'PDSCH mapping type' is B, the DMRS is always transmitted and received in the first symbol of the assigned data time domain resource assigned. In other words, 'PDSCH mapping type B' does not use 'dmrs-typeA-Position' information. In Table 4, K0 refers to offset of a slot index to which the PDCCH through which the DCI is transmitted belongs, and a slot index to which the PDSCH or PUSCH scheduled in the corresponding DCI belongs. For example, when the slot index of the PDCCH is n, the slot index of the PDSCH or PUSCH scheduled by the DCI of the PDCCH is n+K0. In Table, 4, S refers to a starting symbol index of the data time domain resource in one slot. A possible value range of S may be 0 to 13 with reference to a normal cyclic prefix (CP). In Table 4, L refers to a data time domain resource section length in one slot. A possible value range of L may be 1 to 14. However, possible values of S and L may be determined by Equation 1 and Table 7 or Table 8 presented below. Table 4 may show values that are used by the terminal as default before time resource assignment information is received through terminal-specific or terminal-common higher signaling. For example, DCI format 0_0 or 1_0 may always use Table 4 as a default time resource domain value.

Table 4 shows PDSCH time domain resource assignment values, and K1 value may be used on behalf of K2 for PUSCH time domain resource assignment. Table 5 presented below is an example of a PUSCH time domain resource assignment table. Table 5 shows an example of CP-based PDSCH time domain resource assignment.

TABLE 5

| Row index | PDSCH mapping type | $K_0$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 6 if (L − 1) ≤ 7 then
   SLIV = 14 · (L − 1) + S
else
   SLIV = 14 · (14 − L + 1) + (14 − 1 − S)
where 0 < L ≤ 14 − S.

Table 7 presented below is a table showing possible combinations of S and L according to whether the CP is a normal CP or an extended CP and whether the PDSCH mapping type is the type A or type B. Table 7 illustrates combinations of S and L which enable PDSCH time domain resource assignment.

TABLE 7

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Note 1:
S = 3 is applicable only if dmrs-TypeA-Position = 3

Table 8 presented below is a table showing possible combinations of S and L according to whether the CP is a normal CP or an extended CP and whether the PUSCH mapping type is the type A or type B. Table 8 illustrates combinations of S and L which enable PUSCH time domain resource assignment.

TABLE 8

| PUSCH mapping type | Normal cyclic prefix | | | Extended cyclic prefix | | |
|---|---|---|---|---|---|---|
| | S | L | S + L | S | L | S + L |
| Type A | 0 | {4, . . . , 14} | {4, . . . , 14} | 0 | {4, . . . , 12} | {4, . . . , 12} |
| Type B | {1, . . . , 13} | {1, . . . , 14} | {1, . . . , 14} | {1, . . . , 12} | {1, . . . , 13} | {1, . . . , 13} |

In Table 4, each index may be configured through higher signaling parameter PDSCH-TimeDomainResourceAllocationList or PUS CH-TimeDomainResourceAllocationList.

PDSCH-TimeDomainResourceAllocationList may be configured by one or a plurality of higher signaling parameters PDSCH-TimeDomainResourceAllocation, and k0, mappingtype, startSymbolAndLength may be included in PDSCH-TimeDomainResourceAllocation. A possible value range of k0 is 0 to 32. Mappingtype may be set to the type A or type B. A possible value range of StartSymbolAndLength is 0 to 127. As described above, when the mappingtype is the type A, a symbol position of a DMRS may have a value indicated by dmrs-typeA-Position.

PUSCH-TimeDomainResourceAllocationList may be configured by one or a plurality of higher signaling parameters PUSCH-TimeDomainResourceAllocation, and k0, mapping type, startSymbolAndLength exist in PUSCH-TimeDomainResourceAllocation. A possible value range of k0 is 0 to 32. Mappingtype may correspond to the type A or type B. A possible value range of StartSymbolAndLength is 0 to 127. When the mappingtype is the type A as described above, a symbol position of a DMRS may have a value indicated by dmrs-typeA-Position.

The above-described PDSCH-TimeDomainResourceAllocation or PUSCH-TimeDomainResourceAllocation may be a time domain resource allocation method of a PDSCH or PUSCH in one slot. Higher signaling aggregationFactoDL refers to the number of slots in which an applied PDSCH-TimeDomainResourceAllocation value is repeatedly transmitted in one slot. Higher signaling aggregationFactorUL refers to the number of slots in which an applied PUSCH-TimeDomainResourceAllocation value is repeatedly transmitted in one slot. A possible value range of aggregationFactorDL and aggregationFactorUL is {1,2,4,8}. For example, when aggregationFactorDL is 8, it means that a value of one of the possible PDSCH-TimeDomainResourceAllocations is repeatedly transmitted over 8 slots in total. However, when at least some of symbols applied to PDSCH-TimeDomainResourceAllocation in a specific slot are uplink symbols, PDSCH transmission and reception in the corresponding slot may be omitted. Similarly, when at least some of symbols applied to PUSCH-TimeDomainResourceAllocation in a specific slot are downlink symbols, PUSCH transmission and reception in the corresponding slot may be omitted.

Figure 6A:
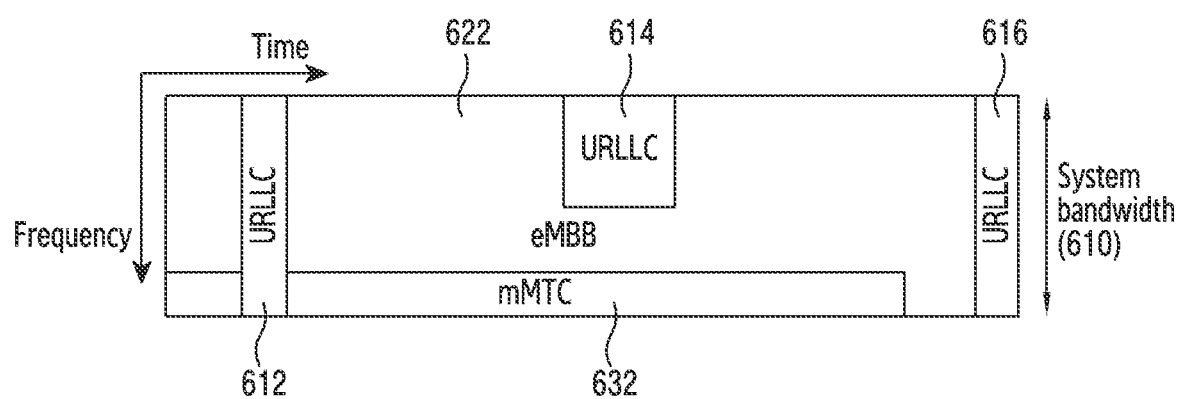
FIG. 6A is a view illustrating an example of allocation of data per service to a frequency-time resource in a wireless communication system according to various embodiments of the disclosure.
Figure 6B:
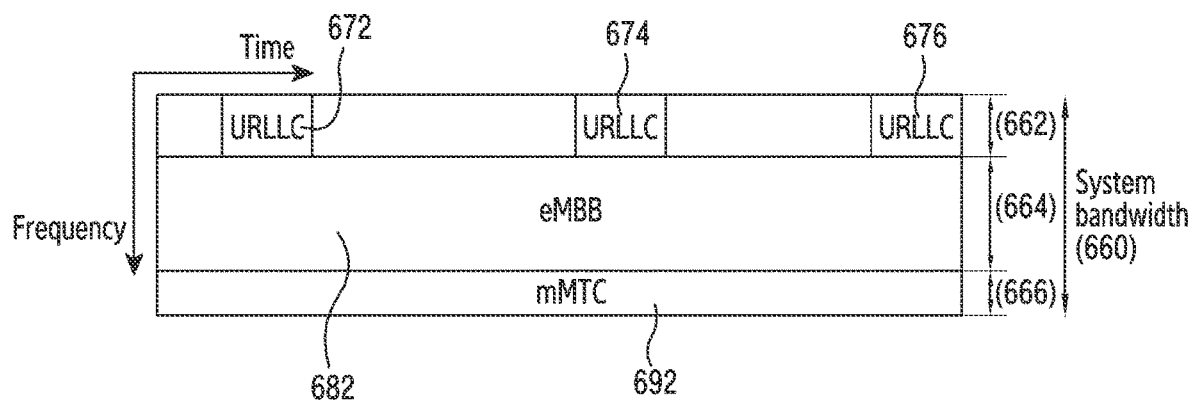
FIG. 6B is a view illustrating another example of allocation of data per service to a frequency-time resource in a wireless communication system according to various embodiments of the disclosure.

The NR system may be designed to allow various services to be freely multiplexed in time and frequency resources from the aspect of services, and accordingly, waveform/numerology, reference signal, etc. may be dynamically or freely adjusted if necessary. In order to provide an optimal service to a terminal in wireless communication, it is important to transmit data optimized through measurement of quality of a channel and interference, and accordingly, it is essential to exactly measure a channel state. However, in the case of a 5G channel which is different from 4G communication in which channel and interference characteristics are not greatly changed depending on frequency resources, channel and interference characteristics may be greatly changed depending on services, and accordingly, it is necessary to support a subset by means of the frequency resource group (FRG) in order to separately measure channel and interference characteristics. Meanwhile, the NR system may divide types of services supported into enhanced mobile broadband (eMBB), massive machine type communications (mMTC), ultra-reliable and low-latency communications (URLLC). The eMBB is a service targeting at high-speed transmission of high-capacity data, mMTC is a service targeting at minimizing terminal power and accessing by a plurality of terminals, URLLC is a service targeting at high reliability and low latency. Different requirements may be applied according to a type of a service applied to a terminal. Examples of resource distribution of respective services are illustrated in FIGS. 6A and 6B. Referring to FIGS. 6A and 6B, a scheme for allocating frequency and time resources to transmit information in each system is identified.

FIG. 6A illustrates an example of allocation of data per service in frequency-time resources in a wireless communication system according to various embodiments of the disclosure. In FIG. 6A, in a whole system frequency band 610, resources may be allocated for eMBB 622, URLLC 612, 614, 616, and mMTC 632. When URLLC 612, 614, 616 data is generated while eMBB 622 data and mMTC 632 data are allocated in a specific frequency band and transmitted, portions already allocated to eMBB 622 and mMTC 632 may be emptied, or data may not be transmitted and the URLLC 612, 614, 616 data may be transmitted. Since URLLC requires reduction of a latency time, resources for transmitting the URLLC 612, 614, 616 data may be allocated to part of resources allocated to eMBB 622. When URLLC 612, 614, 616 is additionally allocated resources which are allocated to eMBB 622 and is transmitted, the eMBB 622 data may not be transmitted in redundant frequency-time resources, and accordingly, transmission performance of the eMBB 622 data may be degraded. That is, in the above-described case, there may be failure to transmit eMBB 622 data due to allocation of resources to the URLLC 612, 614, 616. The scheme shown in FIG. 6A may be referred to as a preemption scheme.

FIG. 6B illustrates another example of allocation of data per service in frequency-time resources in a wireless communication system according to various embodiments of the disclosure. FIG. 6B illustrates that respective services are provided in respective sub-bands 662, 664, 666 divided from a whole system frequency band 660. Specifically, the sub-band 662 is used to transmit URLLC 672, 674, 676 data, the sub-band 664 is used to transmit eMBB 682 data, and the sub-band 666 is used to transmit mMTC 692 data. Information related to configuration of the sub-bands 662, 664, 666 may be pre-determined, and the information may be transmitted from a base station to a terminal through higher signaling. Alternatively, information related to the sub-bands 662, 664, 666 may be arbitrarily divided by a base station or a network node, and services may be provided without transmitting separate sub-band configuration information to the terminal.

According to various embodiments, a length of a transmission time interval (TTI) used for URLLC transmission may be shorter than a length of a TTI used for eMBB or mMTC transmission. In addition, a response to the information related to the URLLC may be transmitted faster than that of eMBB or mMTC, and accordingly, a terminal using the URLLC service may transmit and receive information with low latency. Structures of physical layer channels used for the respective types in order to transmit the above-described 3 types of services or data may be different from one another. For example, at least one of a length of a TTI, an allocation unit of frequency resources, a structure of a control channel, a data mapping method may be different.

Although three types of services and three types of data have been described, more types of services and corresponding data types may exist. In this case, various embodiments described below may be implemented.

Since the URLLC service among the above-described services targets at high reliability and low latency, control information and data information which may be transmitted through a physical channel may need to be transmitted at a low coding rate. In the case of control information, the function of repeatedly transmitting control information has been already introduced in MTC or narrow band internet-of-things (NB-IoT) services of LTE. The purpose of introducing repetitive transmission is to provide a high coverage for terminals having a narrow bandwidth, but a latency time is not well considered. In addition, a minimum unit regarding repetitive transmission of control information is fixed to a sub-frame unit with reference to LTE. In order to support the URLLC service in the NR or 5G system, a control information repetitive transmission mode for enhancing reliability while requiring a short latency time needs to be introduced. Accordingly, the disclosure basically considers a situation where control information is repeatedly transmitted in a slot. In addition, the disclosure also considers a situation where control information capable of being transmitted over a slot boundary is repeatedly transmitted. Through operations provided in the disclosure, a terminal may detect control information transmitted from a base station more rapidly with high reliability.

In a situation where a HARQ-ACK PUCCH that a terminal may transmit in one slot is limited to one, when the terminal receives a higher configuration regarding a semi-static HARQ-ACK codebook, the terminal may report HARQ-ACK information on PDSCH reception or SPS PDSCH release in the HARQ-ACK codebook in a slot that is indicated by a value of a PDSCH-to-HARQ_feedback timing indicator included in DCI format 1_0 or DCI format 1_1. The terminal reports, as ACK, a HARQ-ACK information bit value in the HARQ-ACK codebook in a slot that is not indicated by the PDSCH-to-HARQ_feedback timing indicator field included in the DCI format 1_0 or DCI format 1_1.

On occasions belonging to MA,C for candidate PDSCH reception, the terminal determines only HARQ-ACK information on SPS PDSCH release or PDSCH reception or SPS PDSCH reception. Herein, MA,C refers to a set of occasions for candidate PDSCH reception. In this case, when the HARQ-ACK information report is scheduled by the DCI format 1_0 including information in which a counter DAI field indicates 1 in Pcell, the terminal determines one HARQ-ACK codebook on corresponding SPS PDSCH release or corresponding PDSCH reception. In other cases, HARQ_feedback conforms to a HARQ-ACK codebook determination method which will be described below.

If a set of PDSCH reception candidates in a serving cell c is MA,c, MA,c may be determined according to steps of Table 9 presented below. Table 9 illustrates a pseudo-code for determining MA,c.

TABLE 9 step 1: initializing j to 0, $M_{A,c}$ to a null set.
Initializing k which is a HARQ-ACK
transmission timing index to 0.
step 2: setting R to a set of respective rows
in a table which includes information
of a slot onto which a PDSCH is mapped,
start symbol information, the number of
symbols or length information. Deleting a
corresponding row from R if a PDSCH
possible mapping symbol indicated
by each value of R is set to a UL symbol
according to DL and UL setting set on an upper layer.
step 3-1: receiving, by a terminal,
one PDSCH for unicasting in one slot, and, if R
is not a null set, adding 1 to the set $M_{A,c}$.
step 3-2: if the terminal can receive more
than one PDSCH for unicasting in one
slot, counting the number of PDSCHs
allocatable to different symbols from the
calculated R, and adding the corresponding
number of PDSCHs to $M_{A,c}$.
step 4: increasing k by 1 and resuming step 2.

Figure 7:
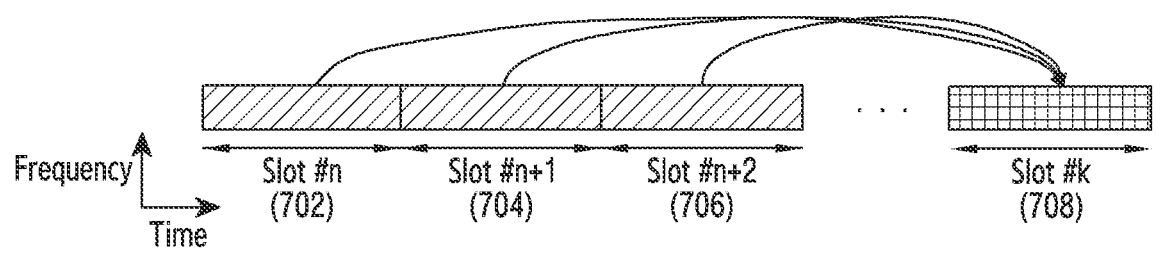
FIG. 7 is a view illustrating an example of setting f a semi-static HARQ-ACK codebook in a wireless communication system according to various embodiments of the disclosure.

FIG. 7 illustrates an example of setting of a semi-static HARQ-ACK codebook in a wireless communication system according to various embodiments of the disclosure. Referring to FIG. 7, in order to perform HARQ-ACK PUCCH transmission in slot #k 708, all slot candidates that enable PDSCH-to-HARQ-ACK timing capable of indicating slot #k 708 are considered. The example of FIG. 7 assumes that HARQ-ACK transmission is possible in slot #k 708 by a PDSCH-to-HARQ-ACK timing combination which is enabled only by PDSCHs scheduled in slot #n 702, slot #n+1 704, slot #n+2 706. In addition, by considering time domain resource setting information of PDSCH that may be scheduled in slots 702, 704, 706, and information indicating whether a symbol in a slot is a downlink symbol or an uplink symbol, the maximum number of schedulable PDSCHs in each slot is derived. For example, if the maximum number of schedulable PDSCHs in slot #n 702 is 2, the maximum number of schedulable PDSCHs in slot #n+1 704 is 3, and the maximum number of schedulable PDSCHs in slot #n+2 706 is 2, the maximum number of PDSCHs that the HARQ-ACK codebook transmitted in slot #k 708 includes is 7 in total. This is referred to as cardinality of the HARQ-ACK codebook.

Based on a PDSCH-to-HARQ_feedback timing value for PUCCH transmission of HARQ-ACK information in slot #n on PDSCH reception or SPS PDSCH release, and transmission slot position information K0 of the PDSCH which is scheduled in DCI format 1_0 or 1_1, a terminal transmits HARQ-ACK information transmitted within one PUCCH in corresponding slot #n. Specifically, in order to transmit HARQ-ACK information, the terminal determines a HARQ-ACK codebook of a PUCCH that is transmitted in a slot determined by PDSCH-to-HARQ_feedback timing and K0 based on a DAI included in DCI indicating PDSCH or SPS PDSCH release.

The DAI is configured by a counter DAI and a total DAI. The counter DAI is information indicating a position of HARQ-ACK information corresponding to a PDSCH scheduled in DCI format 1_0 or DCI format 1_1 in the HARQ-ACK codebook. Specifically, a value of the counter DAI within DCI format 1_0 or 1_1 informs an accumulative value of PDSCH reception or SPS PDSCH release which is scheduled by DCI format 1_0 or DCI format 1_1 in a specific cell c. The accumulative value is set with reference to a PDCCH monitoring occasion where the scheduled DIC exists, and the serving cell.

The total DAI is a value informing a size of the HARQ-ACK codebook. Specifically, a value of the total DAI refers to the total number of PDSCH or SPS PDSCH releases which are scheduled at a previous time including the time at which the DCI is scheduled. In addition, the total DAI is a parameter that is used when HARQ-ACK information in a corresponding serving cell includes HARQ-ACK information on a PDSCH scheduled in other cells including the corresponding serving cell in a carrier aggregation (CA) situation. In other words, in a system operating as one cell, the total DAI parameter may not be used.

Figure 8:
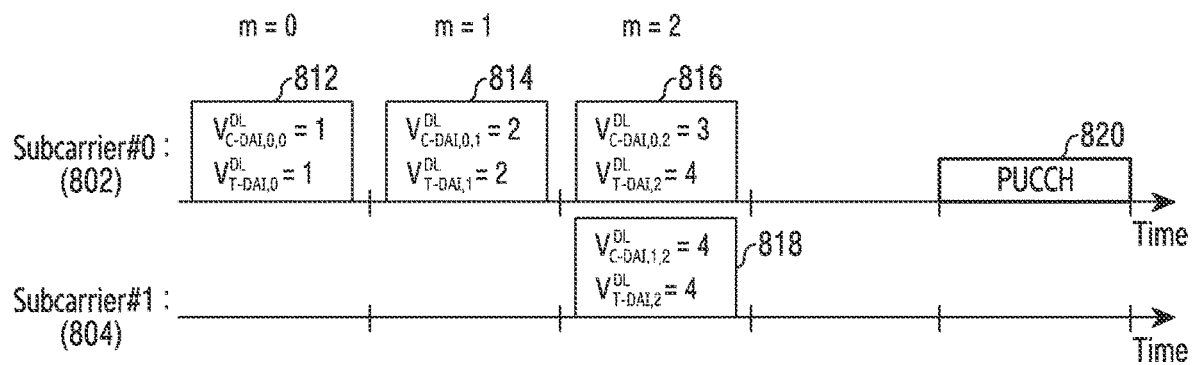
FIG. 8 is a view illustrating an example of setting of a dynamic HARQ-ACK codebook in a wireless communication system according to various embodiments of the disclosure.

An example of an operation regarding the DAI will be described with reference to FIG. 8. FIG. 8 illustrates an example of setting of a dynamic HARQ-ACK codebook in a wireless communication system according to various embodiments of the disclosure. FIG. 8 illustrates changes in values of a counter DAI and a total DAI indicated by DCI which is searched according to a set PDCCH monitoring occasion in each carrier when a HARQ-ACK codebook selected based on the DAI is transmitted through a PUCCH 820 in slot #n of carrier #0 802 if two carriers are set in a terminal. In FIG. 8, m is an index of the PDCCH monitoring occasion, and is aligned in an ascending order of start time of a search space set.

Referring to FIG. 8, a counter DAI and a total DAI included in DCI 812 searched if m=0 indicate 1, respectively. A counter DAI and the total DAI included in DCI 814 searched if m=1 indicate 2, respectively. A counter DAI included in DCI 816 searched in carrier #0 802 (that is, c=0) if m=2 indicates 3. A counter DAI included in DCI 818 searched in carrier #1 804 (that is, c=1) if m=2 indicates 4. In this case, when carriers 0 and 1 are scheduled on the same monitoring occasion, the total DAIs all indicate 4.

The operation of determining the HARQ-ACK codebook described with reference to FIGS. 7 and 8 is performed in a situation where only one PUCCH for transmitting the HARQ-ACK information is transmitted in one slot, and this may be referred to as 'mode 1'. In an example of a method for determining one PUCCH transmission resource in one slot, when PDSCHs scheduled by different DCI are multiplexed to one HARQ-ACK codebook in the same slot, a PUCCH resource selected for HARQ-ACK transmission is determined as a PUCCH resource indicated by a PUCCH resource field indicated by DCI which schedules the PDSCH lastly. That is, the PUCCH resource indicated by the PUCCH resource field indicated in DCI scheduled before the DCI may be disregarded.

Unlike in FIGS. 7 and 8, two or more PUCCHs for transmitting HARQ-ACK information may be transmitted in one slot, and this may be referred to as 'mode 2'. The terminal may operate only in mode 1 (for example, a scheme of transmitting only one HARQ-ACK PUCCH in one slot) or only in mode 2 (for example, a scheme of transmitting one or more HARQ-ACK PUCCHs in one slot). Alternatively, a terminal supporting both mode 1 and mode 2 may be configured to operate only in one mode by higher signaling of a base station, or may be controlled to operate in mode 1 and mode 2 implicitly by a DCI format, RNTI, DCI specific field value, scrambling, etc. For example, a PDSCH scheduled in a DCI format A and HARQ-ACK information associated therewith may be based on mode 1, and a PDSCH scheduled in a DCI format B and HARQ-ACK information associated therewith may be based on mode 2.

In the disclosure, various embodiments for indicating a transmission timing of HARQ-ACK information by using a resource unit having a shorter time length than that of a slot will be described. In the following descriptions, a resource unit having a shorter time length than that of a slot is referred to as a 'sub-slot'. However, the sub-slot may be indicated by other terms, for example, a 'short slot,' a 'feedback slot,' a 'HARQ slot,' a 'HARQ-ACK slot,' an 'ACK slot,' a 'non slot,' a 'configured slot,' a 'temporary slot,' or other terms having the same technical meaning as the above-mentioned terms.

Figure 9A:
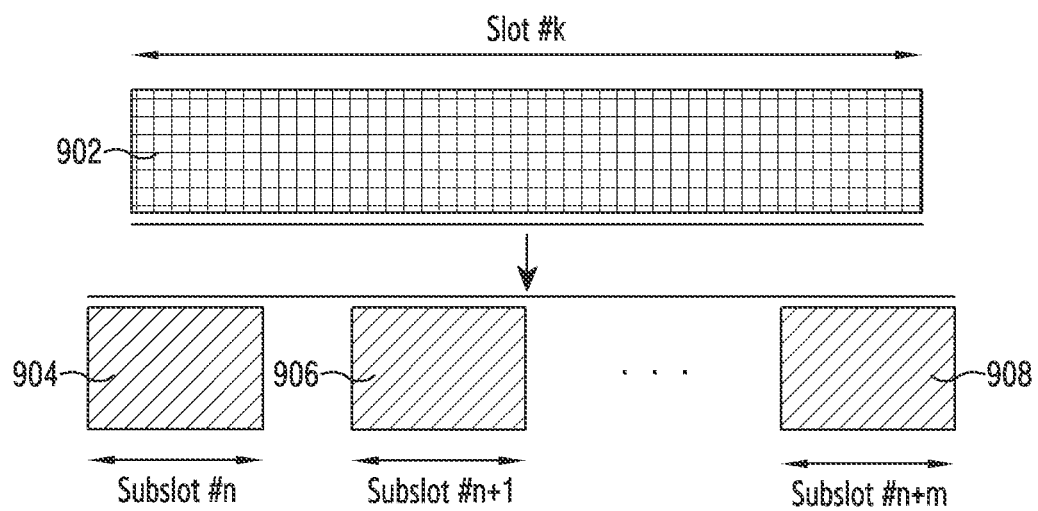
FIGS. 9A and 9B are views illustrating examples of configuration of sub-slots in a wireless communication system according to various embodiments of the disclosure.
Figure 9B:
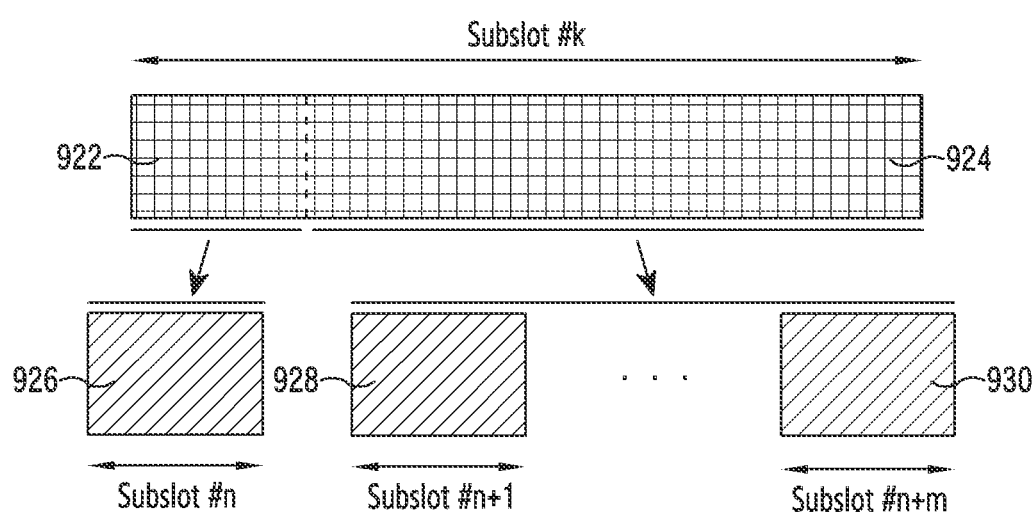

FIGS. 9A and 9B illustrate examples of a sub-slot configuration in a wireless communication system according to various embodiments of the disclosure. FIGS. 9A and 9B illustrate a situation where one slot is divided into one or more sub-slots.

Referring to FIG. 9A, slot #k 902 may be divided into m+1 number of sub-slots 904, 906, 908. The sub-slots 904, 906, 908 may have the same length or may have different lengths. For example, if one slot includes 14 OFDM symbols and one sub-slot includes 7 OFDM symbols in a normal CP, one slot may be divided into 2 sub-slots and each sub-slot may include 7 OFDM symbols, and in this case, the sub-slots may have the same length.

In order to have sub-slots in one slot have the same length, the number of OFDM symbols included in a sub-slot in a slot in a normal CP configured by 14 OFDM symbols should be 1, 2, or 7, and the number of OFDM symbols included in a sub-slot in a slot in an extended CP configured by 12 OFDM symbols should be 1, 2, 3, 4, or 6. In the case of a sub-slot including a different number of OFDM symbols from the number of OFDM symbols mentioned above, it may be impossible to divide the sub-slot in one slot to have the same length and not to overlap. For example, if one slot in a normal CP includes 14 OFDM symbols and a sub-slot includes 3 OFDM symbols, 5 sub-slots in total may be included in one slot, and 4 of the 5 sub-slots may include 3 OFDM symbols and the other one sub-slot may include 2 OFDM symbols. Accordingly, common rules covering all of the above-described conditions in a situation where sub-slots have various lengths are required. To achieve this, at least one of the following embodiments may be employed to configure sub-slots.

■ Embodiment A-1: Method of Configuring Sub-Slots in Sequence Regardless of a Link Direction According to embodiment A-1, sub-slots are configured in an ascending order with reference to a symbol index in a slot. For example, in a situation where there are 14 symbols in one slot 902 in a normal CP, if symbols 0 to 13 exist in sequence and higher signaling is set with a sub-slot length of 3, symbols 0, 1, 2 configure one sub-slot 904, symbols 3, 4, 5 configure the next sub-slot 906, symbols 6, 7, 8 configure the next sub-slot, symbols 9, 10, 11 configure the next sub-slot, and symbols 12, 13 configure the next sub-slot 908. Accordingly, 5 sub-slots in total are configured in one slot. However, in this method, a criterion for grouping sub-slots starts from a smallest value of a symbol index.

This method may be generalized as follows. If one slot is configured by K number of OFDM symbols and higher signaling is set such that a length of one sub-slot is N, in an ascending order of a symbol index in the slot, $\lfloor K/N \rfloor$ number of first sub-slots are configured by sub-slots having a length of N number of OFDM symbols, and after that, $$\left[\left\lceil \frac{K}{N} \right\rceil - \left\lfloor \frac{K}{N} \right\rfloor\right]$$

number of sub-slots are configured by sub-slots having a length of $$\left[K - \left\lfloor \frac{K}{N} \right\rfloor \times N\right]$$

or DM symbols. That is, in FIG. 9A, the sub-slot 904 includes N number of OFDM symbols, and the sub-slot 908 has $$\left[K - \left\lfloor \frac{K}{N} \right\rfloor \times N\right]$$

number of OFDM symbol if the value of $$\left[\left\lceil \frac{K}{N} \right\rceil - \left\lfloor \frac{K}{N} \right\rfloor\right]$$

is not 0 and has N number of OFDM symbols if the value of $$\left[\left\lceil \frac{K}{N} \right\rceil - \left\lfloor \frac{K}{N} \right\rfloor\right]$$

is 0. In addition, in FIG. 9A, if the value of $$\left[\left\lceil \frac{K}{N} \right\rceil - \left\lfloor \frac{K}{N} \right\rfloor\right]$$

is not 0, the value of m is $\lfloor K/N \rfloor$, and if the value of $$\left[\left\lceil \frac{K}{N} \right\rceil - \left\lfloor \frac{K}{N} \right\rfloor\right]$$

is 0, the value of m is $\lfloor K/N \rfloor - 1$. The present method is a method of determining regardless of whether symbols in the slot are downlink symbols or uplink symbols or are flexible (F) symbols.

■ Embodiment A-2: Method of Configuring Sub-Slots in Reverse Order Regardless of a Link Direction According to embodiment A-2, sub-slots are configured in a descending order with reference to a symbol index in a slot. For example, in a situation where there are 14 symbols in one slot 902 in a normal CP, if symbols 0 to 13 exist in sequence and higher signaling is set with a sub-slot length of 3, symbols 11, 12, 13 configure one sub-slot 904, symbols 8, 9, 10 configure the next sub-slot 906, symbols 5, 6, 7 configure the next sub-slot, symbols 2, 3, 4 configure the next sub-slot, and symbols 0, 1 configure the next sub-slot 908. Accordingly, 5 sub-slots in total are configured in one slot. However, in this method, grouping of sub-slots starts from a symbol having a largest value of a symbol index.

This method may be generalized as follows. If one slot is configured by K number of OFDM symbols and higher signaling is set such that a length of one sub-slot is N, in a descending order (reverse order) of a symbol index in the slot, $\lfloor K/N \rfloor$ number of first sub-slots are configured by sub-slots having a length of N number of OFDM symbols, and after that, $$\left[\left\lceil \frac{K}{N} \right\rceil - \left\lfloor \frac{K}{N} \right\rfloor\right]$$

number of sub-slots are configured by sub-slots having a length of $$\left[K - \left\lfloor \frac{K}{N} \right\rfloor \times N\right]$$

OFDM symbols. That is, in FIG. 9A, the sub-slot 904 includes N number of OFDM symbols, and the sub-slot 908 has $$\left[K - \left\lfloor \frac{K}{N} \right\rfloor \times N\right]$$

number of OFDM symbol if the value of $$\left[\left\lceil\frac{K}{N}\right\rceil-\left\lfloor\frac{K}{N}\right\rfloor\right]$$

is not 0 and has N number of OFDM symbols if the value of $$\left[\left\lceil\frac{K}{N}\right\rceil-\left\lfloor\frac{K}{N}\right\rfloor\right]$$

is 0. In addition, in FIG. 9A, if the value of $$\left[\left\lceil\frac{K}{N}\right\rceil-\left\lfloor\frac{K}{N}\right\rfloor\right]$$

is not 0, the value of m is $\lfloor K/N \rfloor$, and if the value of $$\left[\left\lceil\frac{K}{N}\right\rceil-\left\lfloor\frac{K}{N}\right\rfloor\right]$$

is 0, the value of m is $\lfloor K/N \rfloor - 1$. The present method is a method of determining regardless of whether symbols in the slot are downlink symbols or uplink symbols or are flexible symbols.

■ Embodiment A-3: Method of Configuring Sub-Slots in Sequence by Considering a Link Direction Embodiment A-3 is similar to embodiment A-1, but differs therefrom in that sub-slots are configured in one slot by considering link directions which are pre-set by higher signaling. Herein, the link direction may indicate a downlink or an uplink and may be referred to as a 'symbol direction.' According to a basic form of a slot format set by terminal-common or terminal-specific higher signaling in a 5G NR system, at least one symbol of a head portion in the slot is used for the downlink. FIG. 9B illustrates that symbols 922 of a head portion of slot #k are configured as downlink symbols, and symbols 924 following the symbols 922 are configured as flexible symbols or uplink symbols by higher signaling.

According to an embodiment, the symbols 922 set as downlink symbols of the head portion in slot #k may be defined as one sub-slot regardless of a size value of a sub-slot to be set by another higher signaling, that is, the number of symbols included in the sub-slot. In this case, the symbols 922 for the downlink in FIG. 9B may be included in sub-slot #n 926. For example, if the number of symbols 922 for the downlink is D, a length of the sub-slot #n 926 may be D regardless of a value of a size of the sub-slot set by higher signaling. Thereafter, from the other symbols 924 except for the symbols 922 for the downlink in slot #k, sub-slots are determined in sequence based on a length of the sub-slot configured by higher signaling. For example, based on a normal CP, if the number of downlink symbols 922 in one slot is 5, 4 symbols thereafter are configured as flexible symbols, and 5 symbols thereafter are configured as uplink symbols by higher signaling, and the number of symbols of a sub-slot is configured as 4 by another higher signaling, the 5 downlink symbols are included in sub-slot #n 926, and after that, sub-slots each including 4 OFDM symbols are determined in sequence from the 9 symbols included in the flexible symbols and the uplink symbols. Accordingly, sub-slot #n+1 928 may be a sub-slot having 4 OFDM symbols, and the last sub-slot #n+m 930 in the slot may be a sub-slot having one OFDM symbol. Specifically, according to embodiment A-3, symbols 0, 1, 2, 3, 4 in slot #k may be configured as downlink symbols, and may constitute one sub-slot #n 926, and then, in sequence by a sub-slot value configured by higher signaling, symbols 5, 6, 7, 8 may constitute sub-slot #n+1 928, and symbols 9, 10, 11, 12 thereafter may constitute another sub-slot, and lastly, remaining symbol 13 may constitute sub-slot #n+m 930. Herein, m is 3.

This method may be generalized as follows: In a situation where D number of OFDM symbols are set as downlink symbols by higher signaling in a slot configured by K number of OFDM symbols, and a length of one sub-slot is set to N by another higher signaling, if there is at least one downlink symbol in the slot (D>0), one first sub-slot is configured by a sub-slot having a length of D number of OFDM symbols, and, if there is no downlink symbol in the slot (D=0), there is no sub-slot configured by D number of downlink symbols. Thereafter, in an ascending order of a symbol index in the slot (or in sequence), $\lfloor (K-D)/N \rfloor$ number of first sub-slots are configured by sub-slots having a length of N number of OFDM symbols, and thereafter, $$\left[\left\lceil\frac{K-D}{N}\right\rceil-\left\lfloor\frac{K-D}{N}\right\rfloor\right]$$

number of sub-slots are configured by sub-slots having a length of $$\left[(K-D)-\left\lfloor\frac{K-D}{N}\right\rfloor\times N\right]$$

number of OFDM symbols. That is, in FIG. 9, the sub-slot 926 has N number of OFDM symbols, and the sub-slot 930 may have $$\left[(K-D)-\left\lfloor\frac{K-D}{N}\right\rfloor\times N\right]$$

number of OFDM symbols if the value of $$\left[\left\lceil\frac{K-D}{N}\right\rceil-\left\lfloor\frac{K-D}{N}\right\rfloor\right]$$

is not 0, and may have N number of OFDM symbols if the value of $$\left[\left\lceil\frac{K-D}{N}\right\rceil-\left\lfloor\frac{K-D}{N}\right\rfloor\right]$$

is 0. In addition, when there is at least one downlink symbol in the slot (D>0) in FIG. 9, the value of m is $\lfloor (K-D)/N \rfloor + 1$ if the value of $$\left[\left\lceil\frac{K-D}{N}\right\rceil - \left\lfloor\frac{K-D}{N}\right\rfloor\right]$$

is not 0, and the value of m is $\lfloor(K-D)/N\rfloor$ if the value of $$\left[\left\lceil\frac{K-D}{N}\right\rceil - \left\lfloor\frac{K-D}{N}\right\rfloor\right]$$

is 0. When mere is no downlink symbol in the slot (D=0), the value of m is $\lfloor K/N\rfloor$ if the value of is not 0, and the value of m is $\lfloor K/N\rfloor-1$ if the value of $$\left[\left\lceil\frac{K}{N}\right\rceil - \left\lfloor\frac{K}{N}\right\rfloor\right]$$

is not 0, and the value of m is $\lfloor K/N\rfloor-1$ if the value of $$\left[\left\lceil\frac{K}{N}\right\rceil - \left\lfloor\frac{K}{N}\right\rfloor\right]$$

is 0. The present method is a method of determining according to whether symbols in the slot are downlink symbols or uplink symbols, or are flexible symbols. This method may be suitable to a TDD environment where an uplink and a downlink coexist in one frequency band. Of course, the method may be applied to FDD. In this case, since the value of D is 0 with reference to an uplink band, embodiment A-3 may be the same as embodiment A-1.

■ Embodiment A-4: Method of Configuring Sub-Slots in Reverse Order by Considering a Link Direction Embodiment A-4 is similar to embodiment A-2, but is different therefrom in that sub-slots are configured in one slot by considering link directions which are pre-set by higher signaling. According to a basic form of a slot format set by terminal-common or terminal-specific higher signaling in a 5G NR system, at least one symbol of a head portion in the slot is used for the downlink. FIG. 9B illustrates that symbols 922 of a head portion of slot #k are configured as downlink symbols, and symbols 924 following the symbols 922 are configured as flexible symbols or uplink symbols by higher signaling.

According to an embodiment, the symbols 922 set as downlink symbols of the head portion in slot #k may be defined as one sub-slot regardless of a size value of a sub-slot to be set by another higher signaling, that is, the number of symbols included in the sub-slot. In this case, the symbols 922 for the downlink in FIG. 9B may be included in sub-slot #n 926. For example, if the number of symbols 922 for the downlink is D, a length of the sub-slot #n 926 may be D regardless of a value of a size of the sub-slot set by higher signaling. Thereafter, from the other symbols 924 except for the symbols 922 for the downlink in slot #k, sub-slots are determined in reverse order based on a length of the sub-slot configured by higher signaling.

For example, based on a normal CP, if the number of downlink symbols 922 in one slot is 5, 4 symbols thereafter are configured as flexible symbols, and 5 symbols thereafter are configured as uplink symbols by higher signaling, and the number of symbols of a sub-slot is configured as 4 by another higher signaling, the 5 downlink symbols are included in sub-slot #n 926, and after that, sub-slots each including 4 OFDM symbols are configured in reverse order from the 9 symbols included in the flexible symbols and the uplink symbols. Accordingly, sub-slot #n+m 930 may be a sub-slot having 4 OFDM symbols, and sub-slot #n+1 928 in the slot may be a sub-slot having one OFDM symbol. Specifically, according to embodiment A-4, symbols 0, 1, 2, 3, 4 in slot #k may be configured as downlink symbols, and may constitute one sub-slot #n 926, and then, in reverse order by a sub-slot value set by higher signaling, symbols 10, 11, 12, 13 may constitute sub-slot #n+m 930, and symbols 6, 7, 8, 9 thereafter may constitute another sub-slot, and lastly, remaining symbol 15 may constitute sub-slot #n+1 928. Herein, m is 3.

This method may be generalized as follows: In a situation where D number of OFDM symbols are set as downlink symbols by higher signaling in a slot configured by K number of OFDM symbols, and a length of one sub-slot is set to N by another higher signaling, if there is at least one downlink symbol in the slot (D>0), one first sub-slot is configured by a sub-slot having a length of D number of OFDM symbols, and, if there is no downlink symbol in the slot (D=0), there is no sub-slot configured by D number of downlink symbols. Thereafter, in a descending order (or reverse order) of a symbol index in the slot, $\lfloor(K-D)/N\rfloor$ number of first sub-slots from the back are configured by sub-slots having a length of N number of OFDM symbols, and, if there is a sub-slot configured by downlink symbols, $$\left[\left\lceil\frac{K-D}{N}\right\rceil - \left\lfloor\frac{K-D}{N}\right\rfloor\right]$$

number of sub-slots are configured by sub-slots having a length of $$\left[(K-D) - \left\lfloor\frac{K-D}{N}\right\rfloor \times N\right]$$

number of OFDM symbols. That is, in FIG. 9, the sub-slot 930 has N number of OFDM symbols, and the sub-slot 928 may have $$\left[(K-D) - \left\lfloor\frac{K-D}{N}\right\rfloor \times N\right]$$

number of OFDM symbols if the value of $$\left[\left\lceil\frac{K-D}{N}\right\rceil - \left\lfloor\frac{K-D}{N}\right\rfloor\right]$$

is not 0, and may have N number of OFDM symbols if the value of $$\left[\left\lceil\frac{K-D}{N}\right\rceil - \left\lfloor\frac{K-D}{N}\right\rfloor\right]$$

is 0. In addition, when there is at least one downlink symbol in the slot (D>0) in FIG. 9, the value of m is $\lfloor(K-D)/N\rfloor+1$ if the value of $$\left[\left\lceil\frac{K-D}{N}\right\rceil-\left\lfloor\frac{K-D}{N}\right\rfloor\right]$$

is not 0, and the value of m is $\lfloor(K-D)/N\rfloor$ if the value of $$\left[\left\lceil\frac{K-D}{N}\right\rceil-\left\lfloor\frac{K-D}{N}\right\rfloor\right]$$

is 0. When there is no downlink symbol in the slot (D=0), the value of m is $\lfloor K/N \rfloor$ if the value of $$\left[\left\lceil\frac{K}{N}\right\rceil-\left\lfloor\frac{K}{N}\right\rfloor\right]$$

is not 0, and the value of m is $\lfloor K/N \rfloor-1$ if the value of $$\left[\left\lceil\frac{K}{N}\right\rceil-\left\lfloor\frac{K}{N}\right\rfloor\right]$$

is 0. The present method is a method of determining according to whether symbols in the slot are downlink symbols or uplink symbols, or are flexible symbols. This method may be suitable to a TDD environment where an uplink and a downlink coexist in one frequency band. Of course, the method may be applied to FDD. In this case, since the value of D is 0 with reference to an uplink band, embodiment A-3 may be the same as embodiment A-1.

The sub-slots in the slot may be configured by the above-described embodiments, and accordingly, indexes of the sub-slots and the number of OFDM symbols included in each sub-slot may be determined. In this case, only one of the embodiments may be defined in standards or may be selectively applied among the plurality of embodiments. When an embodiment is selectively applied, information regarding a scheme for configuring sub-slots may be transmitted from the base station to the terminal through signaling of a physical layer or a higher layer.

According to an applied embodiment, the terminal may determine a sub-slot index to which a PDSCH scheduled through downlink control information belongs, and a sub-slot index in which a PUCCH including HARQ-ACK information on the PDSCH is scheduled. Herein, the sub-slot index to which the PDSCH belongs may be determined by a last symbol of the scheduled PDSCH or a sub-slot to which time belongs, and a value of K1 (for example, PDSCH to HARQ-ACK timing) of downlink control information existing in the same scheduling information may include a sub-slot interval according to a value of the sub-slot pre-set by higher signaling. For example, if the value of K1 is 1, PUCCH resources for transmitting HARQ-ACK information on the PDSCH are allocated in the next sub-slot of the sub-slot to which the PDSCH belongs by another PUCCH resource indicator (PRI). Specifically, a starting symbol index of various parameters indicated by the PRI may be interpreted as being applied in the sub-slot indicated by the value of K1. For example, if the starting symbol index is 0, the starting symbol index may be interpreted as indicating the first OFDM symbol of the sub-slot indicated by the value of K1 or an OFDM symbol index having the first downlink or flexible link.

Rel-15 NR basically assumes that granularity of the value of K1 is a slot, but in the case of Rel-16 NR, the granularity of the value of K1 varies according to a length of a sub-slot. For example, the granularity value may vary in the range from 1 symbol to 13 symbols or in the case of a normal CP, the granularity value may indicate symbols having common divisors (for example, 1, 2, 7) of 14, or in the case of an extended CP, the granularity value may indicate symbols having common divisors (1, 2, 3, 4, 6) of 12. Alternatively, in the case of the normal CP, the value of K1 may be 2, 7, and in the case of the extended CP, the value of K1 may be 2, 6. DCI to which variable granularity-based K1 is applied is non-fallback DCI, and may be a DCI format that may schedule a PDSCH except for the DCI format 1_1 or 1_0.

One of the above-described embodiments or embodiments which will be described below may be determined by higher signaling or standards and may be used, or may be interchangeably used. Alternatively, in other embodiments than the above-described embodiments, sub-slots may be configured by the number of sub-slots configured in a slot, rather then by the sub-slot length. For example, the number of sub-slots existing in a slot may be pre-configured as N by higher signaling, and in this case, the terminal may configure the number of OFDM symbols formed for each sub-slot according to embodiments A-1 to A-4. Specifically, if the number of OFDM symbols in the slot is K, the length of the sub-slot may be determined by at least one of $\lfloor K/N \rfloor$, $\lceil K/N \rceil$ or $\lfloor K/N \rfloor$, and based on the corresponding length, embodiments A-1 to A-4 may be applied.

Figure 10A:
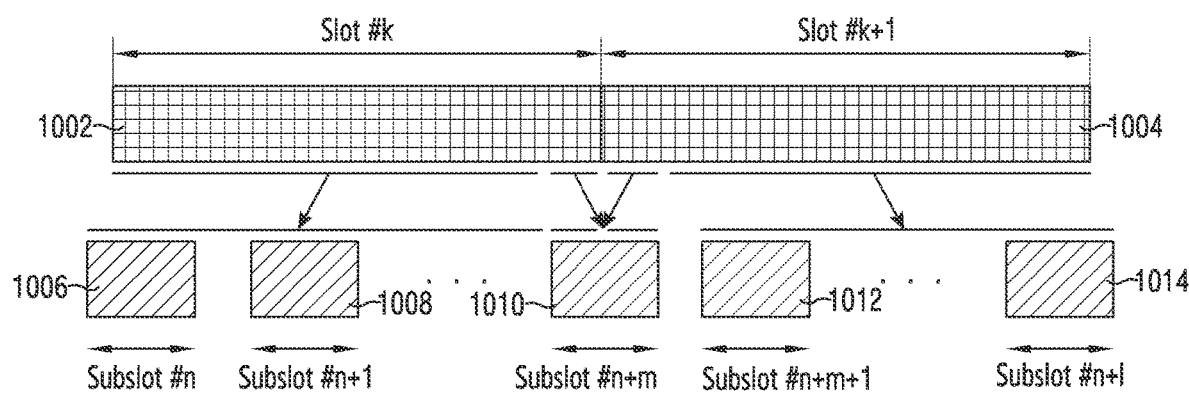
FIGS. 10A and 10B are views illustrating examples of configuration of sub-slots of a terminal in a wireless communication system according to various embodiments of the disclosure.
Figure 10B:
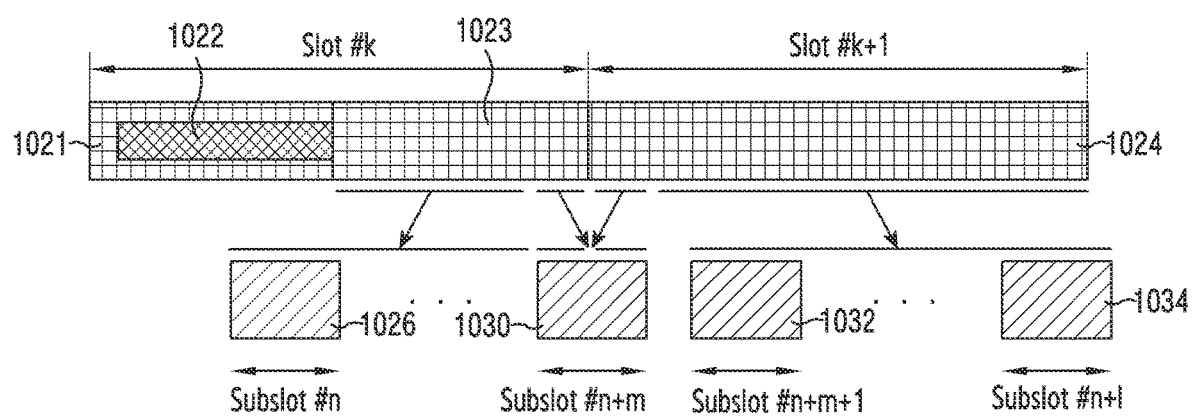

FIGS. 10A and 10B illustrate examples of a sub-slot configuration of a terminal in a wireless communication system according to various embodiments of the disclosure. FIGS. 10A and 10B illustrate a situation where one slot is divided into one or more sub-slots.

Examples of FIGS. 10A and 10B are similar to those of FIGS. 9A and 9B, but are different from FIGS. 9A and 9B in that at least one sub-slot includes symbols belonging to different slots. In FIGS. 10A and 10B, when a size of a sub-slot is pre-configured by the number of OFDM symbol, N, by higher signaling, sub-slots may be configured by at least one of the following embodiments.

■ Embodiment B-1: Method for Defining Sub-Slots from the Start of a Slot

According to embodiment B-1, sub-slots having the same number of OFDM symbols from the first OFDM symbol of a slot in which a PDSCH is scheduled or a specific slot are configured in sequence. For example, referring to FIG. 10A, when a PDSCH is scheduled in slot #k or slot #k is pre-indicated by higher signaling or has a specific value (for example, when the remainder is 0 by dividing by the natural number n), sub-slots are formed in sequence from sub-slot #n 1006 with the N number of symbols which is pre-set by higher signaling from the first symbol. Accordingly, sub-slot #n 1006, sub-slot #n+1 1008, sub-slot #n+m 1010, sub-slot #n+m+1 1012, sub-slot #m+1 1014 all include the same number (=N) of OFDM symbols. In particular, if N1 number of OFDM symbols are included in slot #k 1002, in order for sub-slot #n+m 1010 to include N number of OFDM symbols, the other N-N1 number of OFDM symbols are added from slot #k+1 1004.

■ Embodiment B-2: Method for Defining
Sub-Slots from a PDSCH in a Slot

According to embodiment B-2, sub-slots are configured from the first symbol right after a resource in which a corresponding PDSCH is scheduled in the slot where the PDSCH is scheduled. For example, referring to FIG. 10B, when a PDSCH 1022 is scheduled in slot #k 1021, sub-slots may be configured in sequency with the N number of symbols pre-set by higher signaling, from the symbol right after the PDSCH 1022 is scheduled. Accordingly, sub-slot #n 1026, sub-slot #n+m 1030, sub-slot #n+m+1 1032, sub-slot #n+1 1034 may have the same number of symbols. For example, when the PDSCH 1022 ends at symbol 5 in slot #k 1021, sub-slot #n 1026 may be configured in sequence with the pre-set length N, from the first symbol 6 of resources 1023 of slot #k. If N1 number of OFDM symbols belong to slot #k 1021, in order for sub-slot #n+m 1030 to include the N number of OFDM symbols, the other N-N1 number of OFDM symbols are added from slot #k+1 1024.

Regarding embodiment B-1 or B-2 described above, if a value of $K_1$ included in downlink control information indicates a specific sub-slot index, and the value indicates a sub-slot (for example, sub-slot #n+m 1010 or sub-slot #n+m 1030) configured over two adjacent slots, it may be determined that a terminal instructs at least one of the following operations:

■ Operation A-1: The terminal does not expect that a PRI indicated in a corresponding sub-slot indicates going beyond a real slot boundary. If the corresponding event occurs, the terminal may determine an error case and may perform a certain operation. That is, when sub-slot #n+m is indicated by a value of K1 and a PUCCH resource domain for transmitting HARQ-ACK information indicated by the PRI exits over slot #k and slot #k+1, the terminal may determine this event as an error case. Alternatively, the terminal expects that this event does not occur.

■ Operation A-2: The terminal may expect scheduling in which the PRI indicated in the corresponding sub-slot goes beyond the slot boundary, and may understand that real PUCCH transmission is not transmitting to go beyond the slot boundary, but transmitting a PUCCH by the method of PUCCH repetitive transmission. For example, if sub-slot #n+m is indicated by a value of K1, and two symbols are scheduled in slot #k and two symbols are scheduled in slot #k+1 as PUCCH resource domains for transmitting HARQ-ACK information indicated by the PRI, the terminal may not transmit the PUCCH resource having a 4-symbol length over slot #k and slot #k+1, but may determine to transmit a PUCCH resource having a 2-symbol length in slot #k and to transmit another PUCCH resource having a 2-symbol length in slot #k+1. In this case, uplink transmission performed in the two PUCCH resources has a form of repetitive transmission including the same information.

■ Operation A-3: The terminal may expect scheduling in which that the PRI indicated in the corresponding sub-slot goes beyond the slot boundary, and may understand that real PUCCH transmission is not transmitting to go beyond the slot boundary, but transmitting a PUCCH only in slot #k. For example, if sub-slot #n+m is indicated by a value of K1, and two symbols are scheduled in slot #k and two symbols are scheduled in slot #k+1 as PUCCH resource domains for transmitting HARQ-ACK information indicated by the PRI, the terminal may not transmit the PUCCH resource having a four-symbol length over slot #k and slot #k+1, but may determine to transmit only a PUCCH resource having a 2-symbol length in slot #k. That is, the terminal determines that the other PUCCH resource having a 2-symbol length is not transmitted in slot #k+1. In order to generate the PUCCH of the 2-symbol size to be transmitted in slot #k, the terminal may perform rate mapping based on scheduling information, or may perform puncturing.

The above-described operations A-1 to A-3 are not limited to the situation shown in FIG. 10A or 10B. Similar concepts may be applied to various situations. Herein, the similar concept includes all situations where PUCCH resources for transmitting real HARQ-ACK information exist over the slot boundary or sub-slot boundary by the PRI.

Figure 11:
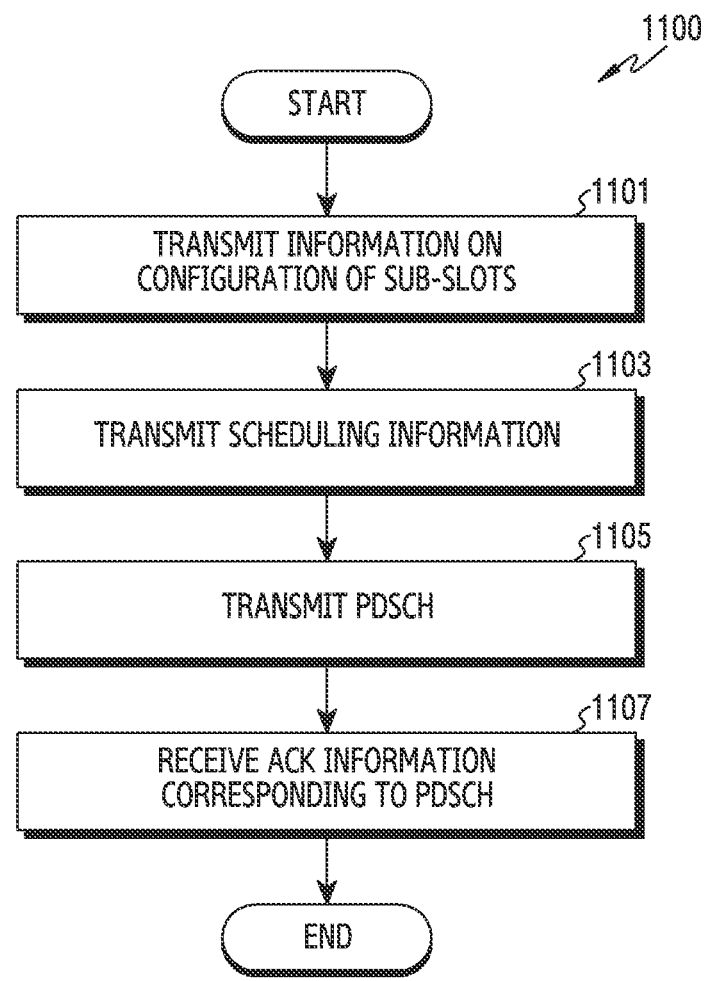
FIG. 11 is a flowchart of a base station for receiving uplink control information on downlink data in a wireless communication system according to various embodiments of the disclosure.

FIG. 11 illustrates a flowchart 1100 of a base station for receiving uplink control information on downlink data in a wireless communication system according to various embodiments of the disclosure. FIG. 11 illustrates a procedure corresponding to an operation of a terminal determining a sub-slot for transmitting HARQ-ACK information on a PDSCH based on sub-slot configuration information provided by higher signaling. FIG. 11 illustrates an operating method of the base station 110.

Referring to FIG. 11, at step 1101, the base station transmits information on configuration of sub-slots. In other words, the base station provides configuration information on sub-slots through higher signaling. For example, the configuration information may include at least one of a length of a sub-slot, the number of sub-slots in one slot, granularity of a value of K1 indicating a PDSCH to HARQ-ACK timing. Accordingly, the base station may inform a terminal of structures of sub-slots (for example, a position, a length, etc.). For example, the terminal may identify the structures of the sub-slots according to any one of the embodiments described above with reference to FIGS. 9A to 10B.

At step 1103, the base station transmits scheduling information. That is, the base station transmits information on a resource domain to which a PDSCH is allocated through downlink control information, and a PUCCH resource domain through which HARQ-ACK information on the corresponding PDSCH is transmitted. The configuration information of the sub-slots, which is transmitted at step 1101, may be applied to DCI format 1_1 or 1_x, or may be applied to DCI format 1_x including CRC which is scrambled into MCS_RNTI or URLLC_RNTI.

At step 1105, the base station transmits the PDSCH. The base station transmits the PDSCH in the PDSCH resource domain which is scheduled by the control information. Accordingly, the terminal performs demodulation and decoding with respect to the PDSCH, that is, data received through the PDSCH. In this case, decoding may fail or succeed. It may be determined whether decoding fails or succeeds, based on a result of CRC.

At step 1107, the base station receives ACK information corresponding to the PDSCH. The base station receives HARQ-ACK information on the PDSCH in the PUCCH resource domain indicated by the control information transmitted at step 1103. In the case of DCI to which the sub-slot configuration is applied, a resource domain indicated by a PRI in the K1-th sub-slot indicated by DCI after the sub-slot to which the PDSCH belongs may be a PUCCH resource. For example, when the PDSCH is included in sub-slot #n, the PUCCH resource in which HARQ-ACK information will be transmitted in sub-slot #n+K1 may be allocated based on the PRI. Specifically, if K1 is a slot unit, a starting symbol index indicated by the PRI may be a value that is indicated, starting from the first OFDM symbol of the slot. If K¬1 is a sub-slot unit, the starting symbol index may be a value that is indicated, starting from the first OFDM symbol of the sub-slot indicated by K1 or the first effective flexible or uplink symbol.

Figure 12:
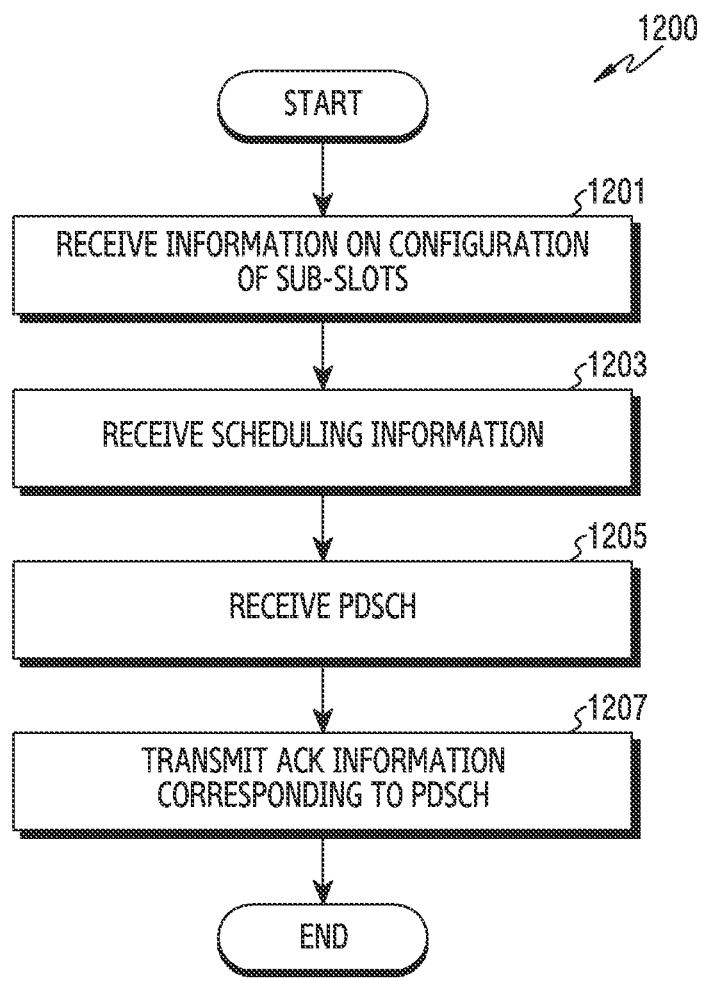
FIG. 12 is a flowchart of a terminal for transmitting uplink control information on downlink data in a wireless communication system according to various embodiments of the disclosure.

FIG. 12 illustrates a flowchart 1200 of a terminal for transmitting uplink control information on downlink data in a wireless communication system according to various embodiments of the disclosure. FIG. 12 illustrates a procedure including an operation of the terminal determining a sub-slot to transmit HARQ-ACK information on a PDSCH, based on sub-slot configuration information provided by higher signaling. FIG. 12 illustrates an operating method of the terminal 120.

Referring to FIG. 12, at step 1201, the terminal receives information of configuration of sub-slots. In other words, the terminal acquires configuration information of sub-slots through higher signaling. For example, the configuration information may include at least one of a length of a sub-slot, the number of sub-slots in one slot, granularity of a value of K1 indicating a PDSCH to HARQ-ACK timing. The terminal acquiring the configuration information may understand structures (for example, a position, a length, etc.) of the sub-slots. For example, the terminal may identify the structures of the sub-slots according to any one of the embodiments described above with reference to FIGS. 9A to 10B.

At step 1203, the terminal receives scheduling information. That is, the terminal acquires information on a resource domain to which a PDSCH is allocated, and on a PUCCH resource domain for transmitting HARQ-ACK information on the corresponding PDSCH, through downlink control information. The configuration information of the sub-slots acquired at step 1201 may be applied to DCI format 1_1 or 1_x, or may be applied to DCI format 1_x including CRC scrambled into MCS_RNTI or URLLC_RNTI.

At step 1205, the terminal receives the PDSCH. The terminal receives the PDSCH in the PDSCH resource domain which is scheduled in control information. Accordingly, the terminal performs demodulation and decoding with respect to the PDSCH, that is, data received through the PDSCH. In this case, decoding may fail or succeed. It may be determined whether decoding fails or succeeds based on a result of CRC.

At step 1207, the terminal transmits ACK information corresponding to the PDSCH. The terminal transmits the HARQ-ACK information on the PDSCH in the PUCCH resource domain indicated by the control information received at step 1203. In the case of DCI to which the sub-slot configuration is applied, a resource domain indicated by a PRI in the K1-th sub-slot indicated by DCI after the sub-slot to which the PDSCH belongs may be a PUCCH resource. For example, when the PDSCH is included in sub-slot #n, the PUCCH resource in which HARQ-ACK information will be transmitted in sub-slot #n+K1 may be allocated based on the PRI. Specifically, if K1 is a slot unit, the terminal may determine that a starting symbol index indicated by the PRI is a value that is indicated, starting from the first OFDM symbol of the slot. If K¬1 is a sub-slot unit, the terminal may determine that the starting symbol index is a value that is indicated, starting from the first OFDM symbol of the sub-slot indicated by K1 or the first effective flexible or uplink symbol.

The terminal may not expect that two PUCCHs including HARQ-ACK information for each of pre-set sub-slots are separately transmitted. If the two PUCCHs are scheduled to be transmitted separately, the terminal may determine an error case.

In addition, DCI format 1_0 of Rel-15 is fallback DCI, and in a situation where the granularity of K1 is not changeable and is always fixed to a slot unit, the terminal may receive non-fallback DCI in addition to the DCI format 1_0 in which the granularity of K1 is changeable, along with the fallback DCI and scheduling information. In this situation, in a sub-slot domain over which the PUCCH resource domain for transmitting HARQ-ACK information on the PDSCH scheduled in DCI format 1_0 exists, the terminal may not expect that the PUCCH resource domain for transmitting HARQ-ACK information on the PDSCH scheduled in DCI format 1_x having the sub-slot unit K1 in addition to DCI format 1_0 is transmitted. If scheduling is performed, the terminal may determine an error case or may cancel transmission of the PUCCH resource scheduled in DCI format 1_0 and may transmit the PUCCH scheduled by DCI format 1_x.

In the embodiment described with reference to FIG. 12, the PUCCH resource domain for transmitting HARQ-ACK information on the PDSCH scheduled by downlink control information through sub-slot configuration information has been described from the point of view of the sub-slots. Hereinafter, an embodiment regarding a situation where PUCCH resource information going beyond a sub-slot or a slot boundary is allocated when PRI information is applied to the corresponding sub-slot will be described.

Figure 13:
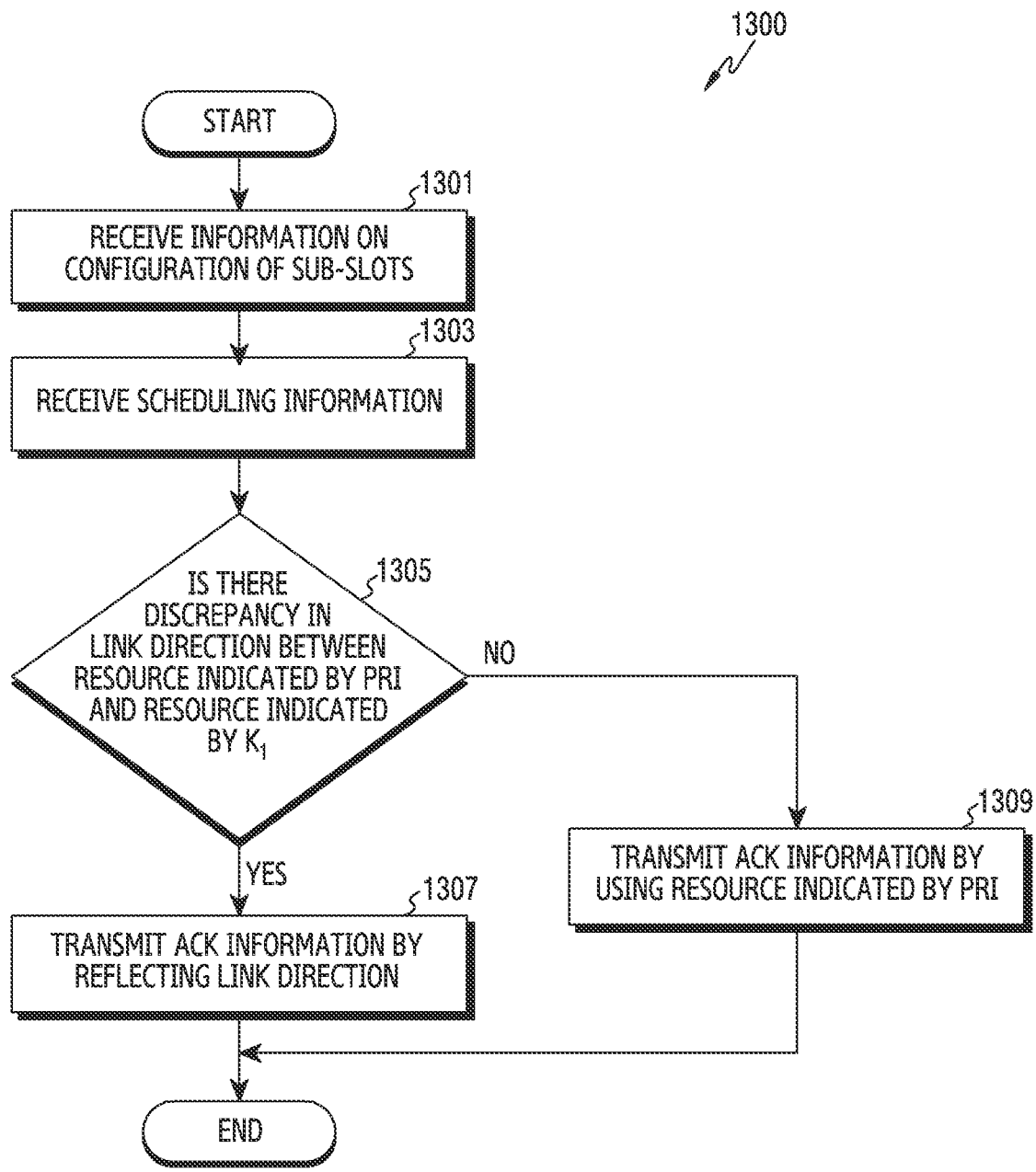
FIG. 13 is another flowchart of a terminal for transmitting uplink control information on downlink data in a wireless communication system according to various embodiments of the disclosure.

FIG. 13 illustrates another flowchart 1300 of a terminal for transmitting uplink control information on downlink data in a wireless communication system according to various embodiments of the disclosure. FIG. 13 illustrates an operating method of the terminal 120.

Referring to FIG. 13, at step 1301, the terminal receives information of configuration of sub-slots. In other words, the terminal acquires configuration information of sub-slots through higher signaling. For example, the configuration information may include at least one of a length of a sub-slot, the number of sub-slots in one slot, granularity of a value of K1 indicating a PDSCH to HARQ-ACK timing. The terminal acquiring the configuration information may understand structures (for example, a position, a length, etc.) of the sub-slots. For example, the terminal may identify the structures of the sub-slots according to any one of the embodiments described above with reference to FIGS. 9A to 10B.

At step 1303, the terminal receives scheduling information. That is, the terminal acquires information on a resource domain to which a PDSCH is allocated, and on a PUCCH resource domain for transmitting HARQ-ACK information on the corresponding PDSCH, through downlink control information. In other words, the terminal may receive a PDSCH from the downlink control information, and may determine a PUCCH resource domain for transmitting HARQ-ACK information thereon.

At step 1305, the terminal determines whether there is discrepancy in the link direction between a resource indicated by a PRI included in the scheduling information and a resource (for example, a sub-slot or a slot) indicated by K1. That is, as a result of interpreting PRI information, a starting symbol index and the number of symbols among parameters indicated by the PRI, and resources (for example, symbols) indicated by the PRI in a sub-slot indicated by a value of K1 may be uplink symbols.

If there is discrepancy in the link direction, the terminal transmits ACK information by reflecting the link direction at step 1307. In other words, the terminal may re-interpret PRI information by considering only an effective resource domain configured with a flexible link and/or uplink symbols, except for at least one downlink symbol in the resource domain indicated by K1, and may transmit a PUCCH including HARQ-ACK information in the corresponding resource domain. The terminal may determine link direction information based on information set by higher signaling, or may additionally determine based on information indicated by a signal of L1. For example, if the resource domain indicated by the PRI includes 5 OFDM symbols in the sub-slot or slot indicated by K1, that is, symbol #x, symbol #x+1, symbol #x+2, symbol #x+3, symbol #x+4, and symbol #x, symbol #x+1, symbol #x+2 are pre-set as downlink symbols by higher signaling, the terminal may understand that the PUCCH resource domain for transmitting HARQ-ACK information includes symbol #x+3, symbol #x+4, and may transmit the PUCCH in the corresponding domain.

On the other hand, if the link directions are the same as each other, the terminal transmits ACK information by using the resource indicated by the PRI at step 1309. When link directions in the resources (for example, sub-slots or slots) indicated by the PRI and K1 included in scheduling information are the same as each other, the terminal may transmit PUCCH information including HARQ-ACK information according to PRI information.

As described above in FIG. 13, ACK information may be transmitted through a corresponding sub-slot even if downlink symbols are included in the sub-slot. According to another embodiment, the condition at step 1305 may be substituted with other conditions or other conditions may be added. For example, when PRI information included in DCI goes beyond a sub-slot boundary, in other words, PRI information is calculated from the first symbol (or the first effective uplink symbol or flexible link symbol) of the sub-slot or the slot indicated by K1, it may be determined whether PRI information is scheduled over the sub-slot boundary. Specifically, if symbols constituting sub-slot #n indicated by K1 include symbol #x, symbol #x+1, symbol #x+2, the PRI starts from symbol #x+1 in sub-slot #n, and a PUCCH resource having a length of 4 symbols is scheduled, the terminal may perform at least one of the following operations:

■ Operation B-1: The terminal determines that a resource domain allocated for the PUCCH goes beyond the sub-slot boundary, and transmits the PUCCH having 4 OFDM symbols according to scheduling. That is, the terminal transmits the PUCCH including HARQ-ACK information by using symbol #x+1, symbol #x+2 in sub-slot #n and the first two symbols belonging to the next sub-slot #n+1, symbol #x+3, symbol #x+4.

■ Operation B-2: The terminal understands that the resource domain allocated for the PUCCH does not go beyond the sub-slot boundary, and transmits the PUCCH by using only scheduled symbols in the slot or sub-slot indicated by K1, unlike scheduling information. That is, the terminal transmits the PUCCH configured by two OFDM symbols by considering only symbol #x+1, symbol #x+2 in sub-slot #n. To summarize, even if scheduled PRI indicates four OFDM symbols, the terminal determines that only symbols existing in the sub-slot indicated by K1 are really scheduled, and transmits the PUCCH.

■ Operation B-3: The terminal does not expect that scheduled PRI information goes beyond the sub-slot boundary, and, when such scheduling occurs, the terminal may determine an error case and may perform a certain operation.

According to operations B-1 to B-3 described above, operations of the terminal are different according to whether PRI information goes beyond the sub-slot boundary. Similar classification of operations may be applied even when PRI information goes beyond a slot boundary rather than the sub-slot boundary.

According to various embodiments as described above, it is possible to indicate a PUCCH transmission timing of a sub-slot unit. Since the NR system supports various numerologies, different subcarrier spacings may be applied in the uplink and the downlink. In this case, an alternative for determining an index of a sub-slot is required.

Figure 14:
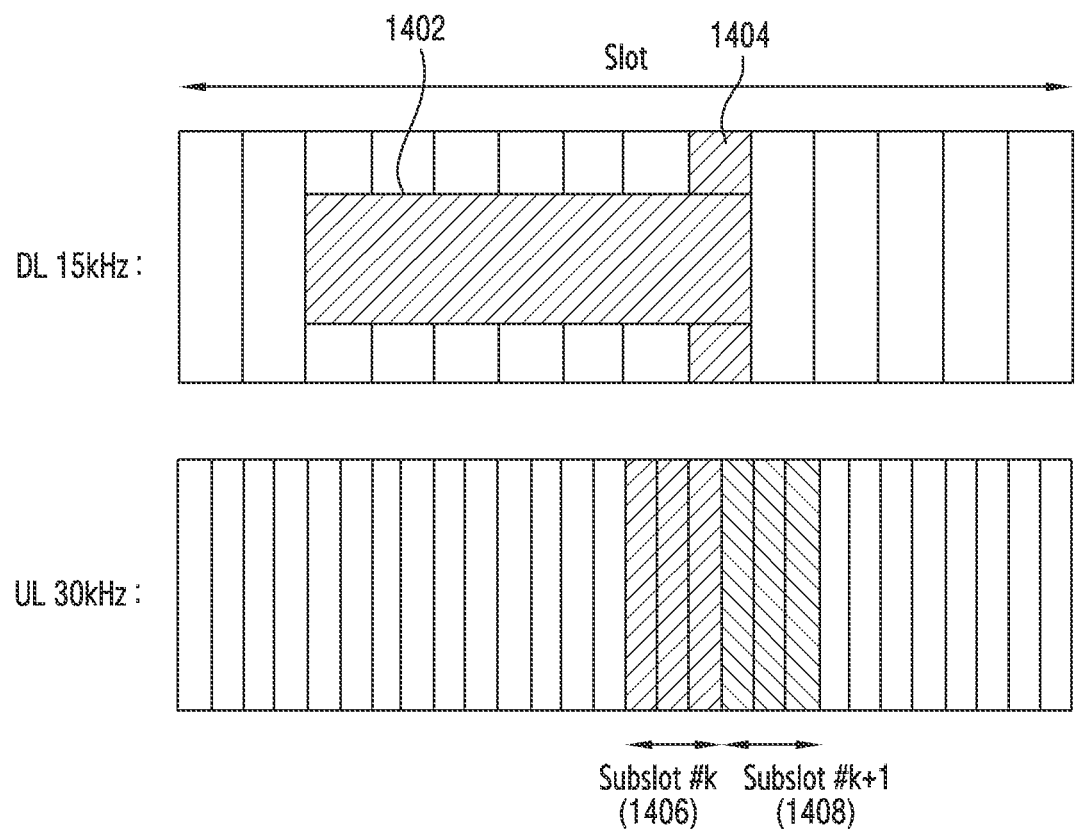
FIG. 14 is a view illustrating an example of a situation where subcarrier spacings of a downlink and an uplink are different in a wireless communication system according to various embodiments.

FIG. 14 illustrates an example of a situation where subcarrier spacings of an uplink and a downlink are different in a wireless communication system according to various embodiments of the disclosure. FIG. 14 illustrates that, in an FDD environment where a downlink frequency band and an uplink frequency band are different from each other, a subcarrier spacing of the downlink frequency band is set to 15 kHz, and a subcarrier spacing of the uplink frequency band is set to 30 kHz. In the case of FIG. 14, when sub-slots are previously set by higher signaling, there is a need for determining a sub-slot to which a PDSCH belongs. Specifically, FIG. 14 illustrates a situation where a PDSCH 1402 is scheduled, and the last symbol 1404 where the PDSCH 1402 is scheduled corresponds to both sub-slot #k 1406 and sub-slot #k+1 1408 with reference to a subcarrier spacing applied to the uplink frequency band.

The situation illustrated in FIG. 14 assumes that a timing advance (TA) value necessary for uplink transmission is 0. Since various terminals within a base station have different TA values and synchronize an uplink frame and a downlink frame to match with the same time synchronization, sub-slots may be grouped, and it is assumed that the TA is 0 to determine a sub-slot index to which the scheduled PDSCH belongs. Alternatively, the TA value may be specified in standards in order to use a specific value, or may be set by another higher signaling. When the situation illustrated in FIG. 14 occurs, the terminal may perform one of at least following operations to determine an index of a sub-slot to which the PDSCH belongs. In addition, FIG. 14 illustrates a situation where both the downlink band and the uplink band have a normal CP, but at least one of the operations described below may be performed even in a situation where at least one of the downlink band and the uplink band has a subcarrier spacing of 60 kHz and is set to an extended CP.

■ Operation C-1: The terminal understands that the scheduling PDSCH belongs to sub-slot #k, and determines a sub-slot for transmitting a PUCCH including HARQ-ACK information by considering K1 from the corresponding sub-slot. To generalize this, when the last symbol of the scheduled PDSCH exists over one or more sub-slots from the point of view of uplink subcarrier, the terminal determines that the PDSCH belongs to an early sub-slot index. Additionally, in order to determine this, the terminal may not consider the TA or may understand that the TA value is 0.

■ Operation C-2: The terminal understands that the scheduling PDSCH belongs to sub-slot #k+1, and determines a sub-slot for transmitting a PUCCH including HARQ-ACK information by considering K1 from the corresponding sub-slot. To generalize this, when the last symbol of the scheduled PDSCH exists over one or more sub-slots from the point of view of uplink subcarrier, the terminal determines that the PDSCH belongs to a late sub-slot index. Additionally, in order to determine this, the terminal may not consider the TA or may understand that the TA value is 0.

■ Operation C-3: Operation C-1 or C-2 is indicated by higher signaling or an L1 signal, and the terminal operates as indicated.

Embodiments of the disclosure disclosed in the specification and the drawings propose a specific example to assist easy explanation of the technical matters of the disclosure and easy understanding of the disclosure, and are not intended to limit the scope of the disclosure. That is, it is obvious to those skilled in the related-art that other variations are possible based on the technical concept of the disclosure. In addition, the respective embodiments may be combined an operated if necessary. For example, the base station and the terminal may be operated in combination of parts of embodiment 1, embodiment 2, and embodiment 3 of the disclosure. In addition, the embodiments are proposed with reference to an NR system, but other variations based on the technical concept of the embodiments are possible for other systems such as FDD or TDD LTE systems.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

The invention claimed is:

1. A method performed by a user equipment (UE) in a wireless communication system, the method comprising:
receiving, from a base station via a radio resource control (RRC) signaling, configuration information on a subslot for a physical uplink control channel (PUCCH), wherein the configuration information includes length information indicating a number of symbols in the subslot;
receiving, from the base station, downlink control information (DCI) scheduling a physical downlink shared channel (PDSCH), the DCI including a PDSCH to hybrid automatic repeat request (PDSCH-to-HARQ) feedback timing indicator and a PUCCH resource indicator;
receiving, from the base station, the PDSCH;
identifying, based on the PDSCH-to-HARQ feedback timing indicator and the PUCCH resource indicator included in the DCI, a PUCCH resource for transmitting HARQ-acknowledgement (HARQ-ACK) information for the PDSCH, wherein the PUCCH resource is identified from a last subslot that overlaps with a last symbol of the PDSCH and a starting symbol of the PUCCH resource is relative to a first symbol among the number of symbols in the subslot, and the starting symbol of the PUCCH resource is identified based on the DCI; and
transmitting, to the base station, the HARQ-ACK information on the PUCCH resource starting from the starting symbol in the subslot,
wherein a plurality of subslots including the last subslot map to the PDSCH, according to a mapping based on a subcarrier spacing for a downlink frequency band and a subcarrier spacing for an uplink frequency band.

2. The method of claim 1,
wherein, in case that a normal cyclic prefix (CP) is configured, the number of symbols in the subslot is two or seven, and
wherein, in case that an extended CP is configured, the number of symbols in the subslot is two or six.

3. A user equipment (UE) comprising:
at least one transceiver;
at least one processor communicatively coupled to the at least one transceiver; and
at least one memory, communicatively coupled to the at least one processor, storing instructions executable by the at least one processor individually or in any combination to cause the UE to:
receive, from a base station via a radio resource control (RRC) signaling, configuration information on a subslot for a physical uplink control channel (PUCCH), wherein the configuration information includes length information indicating a number of symbols in the subslot,
receive, from the base station, downlink control information (DCI) scheduling a physical downlink shared channel (PDSCH), the DCI including a PDSCH to hybrid automatic repeat request (PDSCH-to-HARQ) feedback timing indicator and a PUCCH resource indicator,
receive, from the base station, the PDSCH,
identify, based on the PDSCH-to-HARQ feedback timing indicator and the PUCCH resource indicator included in the DCI, a PUCCH resource for transmitting HARQ-acknowledgement (HARQ-ACK) information for the PDSCH, wherein the PUCCH resource is identified from a last subslot that overlaps with a last symbol of the PDSCH and a starting symbol of the PUCCH resource is relative to a first symbol among the number of symbols in the subslot and the starting symbol of the PUCCH resource is identified based on the DCI, and transmit, to the base station, the HARQ-ACK information on the PUCCH resource starting from the starting symbol in the subslot, wherein a plurality of subslots including the last subslot map to the PDSCH, according to a mapping based on a subcarrier spacing for a downlink frequency band and a subcarrier spacing for an uplink frequency band.

4. The UE of claim 3, wherein, in case that a normal cyclic prefix (CP) is configured, the number of symbols in the subslot is two or seven, and wherein, in case that an extended CP is configured, the number of symbols in the subslot is two or six.

5. A method performed by a base station in a wireless communication system, the method comprising:

transmitting, to a user equipment (UE) via a radio resource control (RRC) signaling, configuration information on a subslot for a physical uplink control channel (PUCCH), wherein the configuration information includes length information indicating a number of symbols in the subslot;

transmitting, to the UE, downlink control information (DCI) scheduling a physical downlink shared channel (PDSCH), the DCI including a PDSCH to hybrid automatic repeat request (PDSCH-to-HARQ) feedback timing indicator and a PUCCH resource indicator;

transmitting, to the UE, the PDSCH; and receiving, from the UE, HARQ-acknowledgement (HARQ-ACK) information for the PDSCH on a PUCCH resource based on the PDSCH-to-HARQ feedback timing indicator and the PUCCH resource indicator included in the DCI, wherein the PUCCH resource is based on a last subslot overlapping with a last symbol of the PDSCH, wherein a starting symbol of the PUCCH resource is relative to a first symbol among the number of symbols in the subslot, and the starting symbol of the PUCCH resource is based on the DCI, wherein the HARQ-ACK information is received on the PUCCH starting from the starting symbol in the subslot, and wherein a plurality of subslots including the last subslot map to the PDSCH, according to a mapping based on a subcarrier spacing for a downlink frequency band and a subcarrier spacing for an uplink frequency band.

6. The method of claim 5, wherein, in case that a normal cyclic prefix (CP) is configured, the number of symbols in the subslot is two or seven, and wherein, in case that an extended CP is configured, the number of symbols in the subslot is two or six.

7. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE) via a radio resource control (RRC) signaling, configuration information on a subslot for a physical uplink control channel (PUCCH), wherein the configuration information includes length information indicating a number of symbols in the subslot, transmit, to the UE, downlink control information (DCI) scheduling a physical downlink shared channel (PDSCH), the DCI including a PDSCH to hybrid automatic repeat request (PDSCH-to-HARQ) feedback timing indicator and a PUCCH resource indicator, transmit, to the UE, the PDSCH, and receive, from the UE, HARQ-acknowledgement (HARQ-ACK) information for the PDSCH on a PUCCH resource based on the PDSCH-to-HARQ feedback timing indicator and the PUCCH resource indicator included in the DCI, wherein the PUCCH resource is based on a last subslot overlapping with a last symbol of the PDSCH, wherein a starting symbol of the PUCCH resource is relative to a first symbol among the number of symbols in the subslot, and the starting symbol of the PUCCH resource is based on the DCI, wherein the HARQ-ACK information is received on the PUCCH starting from the starting symbol in the subslot, and wherein a plurality of subslots including the last subslot map to the PDSCH, according to a mapping based on a subcarrier spacing for a downlink frequency band and a subcarrier spacing for an uplink frequency band.

8. The base station of claim 7, wherein, in case that a normal cyclic prefix (CP) is configured, the number of symbols in the subslot is two or seven, and wherein, in case that an extended CP is configured, the number of symbols in the subslot is two or six.

* * * * *